(12) United States Patent
Foley et al.

(10) Patent No.: US 11,443,249 B2
(45) Date of Patent: Sep. 13, 2022

(54) PERMITTING OR DENYING ACCESS TO LIGHT ELECTRIC VEHICLES BASED ON DETECTED OR ANTICIPATED ENVIRONMENTAL CONDITIONS

(71) Applicant: Uber Technologies, Inc., San Francisco, CA (US)

(72) Inventors: Nicholas Foley, San Francisco, CA (US); Michael Beckmann, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 106 days.

(21) Appl. No.: 16/945,777

(22) Filed: Jul. 31, 2020

(65) Prior Publication Data

US 2021/0035032 A1  Feb. 4, 2021

Related U.S. Application Data

(60) Provisional application No. 62/881,931, filed on Aug. 1, 2019.

(51) Int. Cl.
| | | |
|---|---|---|
| *G06Q 10/02* | (2012.01) | |
| *G06Q 30/06* | (2012.01) | |
| *G01W 1/10* | (2006.01) | |
| *G01W 1/04* | (2006.01) | |

(52) U.S. Cl.
CPC ........ *G06Q 10/02* (2013.01); *G06Q 30/0645* (2013.01); *G01W 1/04* (2013.01); *G01W 1/10* (2013.01)

(58) Field of Classification Search
CPC ..... G06Q 10/02; G06Q 30/0645; G01W 1/04; G01W 1/10
USPC .......................................................... 705/5
See application file for complete search history.

(56) References Cited

U.S. PATENT DOCUMENTS

| | | | |
|---|---|---|---|
| 2016/0111006 A1* | 4/2016 | Srivastava | G08G 5/0043 |
| | | | 701/3 |
| 2017/0178518 A1* | 6/2017 | Foladare | G01C 21/20 |
| 2018/0061251 A1* | 3/2018 | Venkatraman | B64C 39/024 |

OTHER PUBLICATIONS

"Electric vehicle rental and electric vehicle adoption" Published by Elsevier (Year: 2019).*

* cited by examiner

*Primary Examiner* — Zeina Elchanti
(74) *Attorney, Agent, or Firm* — Dority & Manning, P.A.

(57) ABSTRACT

This disclosure generally relates to a light electric vehicle. More specifically, this disclosure describes how to limit or restrict access to a light electric vehicle based on determined or anticipated environmental conditions. The disclosure also describes how to change one or more capabilities or operating parameters of the light electric vehicle based on determined and/or anticipated environmental conditions.

20 Claims, 11 Drawing Sheets

PERMITTING OR DENYING ACCESS TO LIGHT ELECTRIC VEHICLES BASED ON DETECTED OR ANTICIPATED ENVIRONMENTAL CONDITIONS

CROSS-REFERENCE TO RELATED APPLICATIONS

This application claims priority to U.S. Provisional Application No. 62/881,931, titled "Permitting or Denying Access to Light Electric Vehicles based on Detected or Anticipated Environmental Conditions," filed on Aug. 1, 2019. The entire disclosure of which is hereby incorporated by reference in its entirety.

BACKGROUND

Electric vehicles are publically available for individuals to ride for a period of time. However, because the electric vehicles are publically available, it is difficult to restrict access to them.

SUMMARY

Electric ridesharing vehicles, such as electric assist bicycles and electric scooters (also referred to herein as "electric vehicles" or "light electric vehicles"), are typically available for individuals to reserve and use for a period of time. In some cases, a fee or cost is associated with a reservation or use period. Reservation and use of these light electric vehicles is typically not restricted. As such, individuals may reserve and/or use a light electric vehicle during any time of day or night, during good weather or inclement weather. However, riding a light electric vehicle when it is dark or during inclement weather may cause unsafe riding conditions for the individual.

Accordingly, the present disclosure is directed to limiting or restricting access to, reservation of, and/or use of various light electric vehicles based, at least in part, on one or more determined environmental conditions. Additionally, the present disclosure also describes how to limit and/or alter one or more operating parameters or features of the light electric vehicle based on determined or anticipated environmental conditions in a geographic area.

For example, the present disclosure describes a method for receiving environmental condition information for a geographic area. In some cases, the geographic area has one or more light electric vehicles that are available for reservation by an individual. Capability information of the one or more light electric vehicles is also received. One or more restriction constraints for the one or more light electric vehicles may then be generated. In some examples, the one or more restriction constraints may be based, at least in part, on the environmental condition information and the capability information of the one or more light electric vehicles. One or more instructions may then be transmitted to the one or more light electric vehicles to implement the one or more restriction constraints.

Also described is a system having at least one processor and a memory communicatively coupled to the at least one processor. The memory stores instructions that, when executed by the at least one processor, perform operations. These operations may include determining a current location of a light electric vehicle available for use by an individual. Capability information of the light electric vehicle is also received and/or determined. Environmental condition information may also be received and used to determine an environmental condition associated with the current location. The capability information of the light electric vehicle and the environmental condition information is used to determine whether to alter at least one capability of the light electric vehicle. Instructions may then be sent to the light electric vehicle. The instructions cause the light electric vehicle to alter the at least one capability.

In yet another example, the present application describes a method for restricting access to a light electric vehicle. In this example, a current location of an individual is determined. Once the current location of the individual is determined, one or more light electric vehicles available for reservation or use in the current location are identified. When environmental condition information for the particular location is received, a determination is made as to whether to restrict public access to at least one of the one or more light electric vehicles. When it is determined that public access to the at least one of the one or more light electric vehicles is to be restricted, an instruction is sent to the at least one of the one or more light electric vehicles that causes the at least one of the one or more light electric vehicles to change one or more availability parameters.

BRIEF DESCRIPTION OF THE DRAWINGS

Non-limiting and non-exhaustive examples are described with reference to the following Figures.

DETAILED DESCRIPTION

Figure 1A:
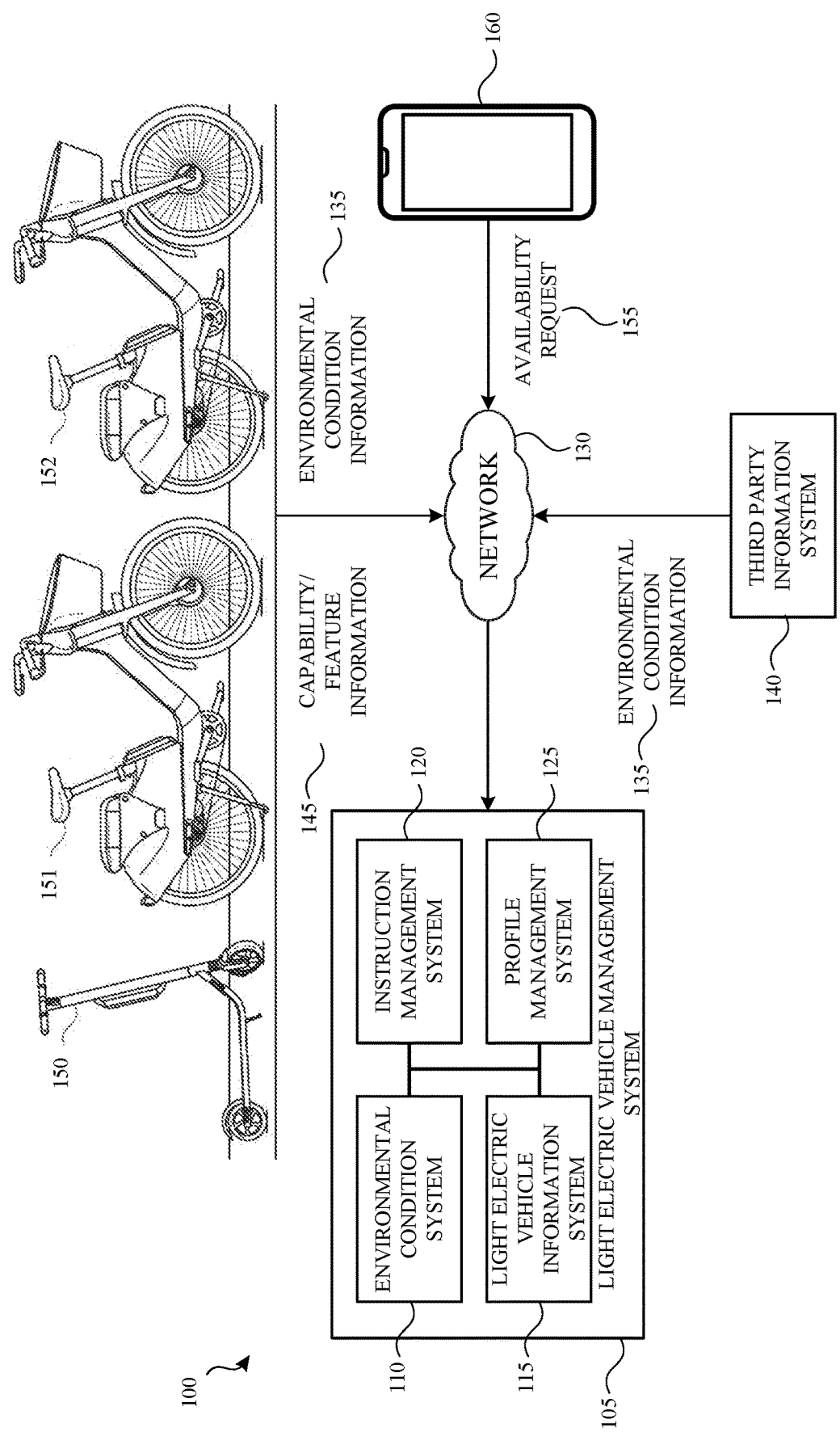
FIG. 1A illustrates a system for permitting and restricting access to one or more light electric vehicles according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Electric ridesharing vehicles, such as electric assist bicycles and electric scooters are available for individuals to reserve, access or use for a period of time. To reserve a light electric vehicle, an individual may access an application executing on a mobile phone or other computing device and the application displays a location of one or more light electric vehicles near a determined location of the individual. The individual may select a particular light electric vehicle using the application. The individual may then proceed to an indicated location of the light electric vehicle, activate the light electric vehicle and begin using the light electric vehicle. In some cases, a cost is required to use and/or reserve the light electric vehicle. When the individual has reached her desired location, the individual may end the use period using the application. The light electric vehicle may then be subsequently reserved or used by another individual.

In other cases, the individual may locate a particular light electric vehicle without the use of the application. For example, the individual may be walking down the street and see a light electric vehicle that is available for use. The individual may approach the light electric vehicle, access the application and provide input to the application indicating that the individual wants to reserve the light electric vehicle or begin a use period. Once the individual has reached her desired destination, she may end the use period of the light electric vehicle using the application. The light electric vehicle may then be reserved and/or used by another individual.

In order for light electric vehicles to be made publicly available, they are often left out in the open (e.g., sidewalks, parking lots, etc.). As such, access, use and reservation of these light electric vehicles is typically not restricted. For example, the individual may reserve and/or use a light electric vehicle during any time of day or night. Likewise, the individual may reserve and/or use a light electric vehicle during good weather or inclement weather. However, riding a light electric vehicle when it is dark or during inclement weather may cause unsafe riding conditions for the individual.

Accordingly, the present disclosure is directed to limiting or restricting access to, use of, or reservation of, various light electric vehicles based, at least in part, on one or more determined current or anticipated environmental conditions in a particular geographic area. Additionally, the present disclosure describes how to limit one or more operating parameters of the light electric vehicle based on determined current or anticipated environmental conditions in a particular geographic area.

For example, a speed of a particular light electric vehicle in a particular geographic area may be limited based, at least in part, one or more detected or determined environmental conditions in that particular geographic area. In another example, it may be determined that the tire pressure of one or more tires of the light electric vehicle would cause an unsafe riding condition during a particular environmental condition. Likewise, light electric vehicles that have worn brake pads may require a longer stopping distance during wet conditions than those light electric vehicles that have newer brake pads. Newer models of light electric vehicles may have features or functionalities that act to mitigate potential unsafe riding conditions during the occurrence of certain environmental conditions when compared to older models. As such, if an environmental condition could cause potential unsafe riding conditions, use of some or all light electric vehicles may need to be limited or restricted until the environmental condition has passed.

As used herein, the term "environmental condition(s)" means one or more factors or conditions that relate to the current or forecast weather in a particular geographic area or at a particular location and/or an amount of natural light at a given time in the particular geographic area and/or location. For example, the weather in the particular geographic area or location may include, but is not limited to, current and/or forecast temperatures, current and/or forecast precipitation (e.g., rain, snow, hail etc.), current and/or forecast wind currents/speeds, current and/or forecast fog conditions and other such weather conditions. Likewise, an amount of natural light at a given time and location may correspond to a particular time of day (e.g., 1:00 PM, 1:00 AM etc.) and may be based, at least in part, on the Earth's orbit around the sun. For example, in a particular geographic area or location during the summer, the sun may rise at approximately 5:50 AM and set at approximately 9:05 PM. However, in the winter, the sun may rise at approximately 7:00 AM and set at approximately 4:50 PM.

In addition to the environmental conditions described above, access to a light electric vehicle may also be restricted and/or permitted based, at least in part, on one or more capabilities and/or features of the light electric vehicle. For example, an electric bicycle or an electric scooter may have one or more lights (e.g., a headlight). As such, an individual may be permitted to reserve, access or use an electric bicycle or an electric scooter that has a headlight during later times of the day (e.g., after 9:00 PM) when compared with electric bicycles or electric scooters that do not have a headlight.

Likewise, an individual may be permitted to reserve, access or use an electric scooter or an electric bicycle having certain rim width (e.g., 2.6 inches wide) and/or tire width (e.g., 3.75 inches wide) during inclement weather (e.g., rain or snow) when compared to other electric bicycles or electric scooters that have tires and/or rims with smaller widths. In yet another example, a light electric vehicle having a particular battery state of charge and/or a determined efficiency above a threshold may be reserved and/or used during the occurrence of certain environmental conditions (e.g., when wind speeds are above a particular threshold and/or when a current temperature is above a threshold temperature). Additionally, light electric vehicles having more recent maintenance histories (e.g., those electric vehicles that have been serviced/repaired within a threshold amount of time, such as, for example, within the last week, within the last month etc.) may be reserved and/or used during the occurrence certain environmental conditions while other light electric vehicles may be subject to one or more restriction constraints.

As briefly described above, an individual may reserve or request access to a light electric vehicle using an application executing on a mobile device or other computing device associated with the individual. In a similar manner, notification of reservation restrictions, access restrictions, and/or changes in the capabilities of a light electric vehicle (collectively referred to herein as restriction constraints) due to the current or forecast environmental condition(s) may also be provided to the individual by the application. For example, when the individual desires to reserve or use a light electric vehicle but one or more environmental conditions and/or one or more features and/or capabilities of the light electric vehicle could lead to unsafe riding conditions (e.g., the light electric vehicle does not have a headlight, the efficiency of the light electric vehicle is below an efficiency threshold, the light electric vehicle has worn brake pads, etc.), a user interface of the application may provide a notification to the individual that this particular light electric vehicle is not currently available to reserve or use due to potentially unsafe riding conditions caused by the current environmental conditions in that geographic area and/or the predicted/forecast environmental conditions in that geographic area.

In such a case, the individual may be directed to another light electric vehicle that has capabilities and/or features that mitigate the potentially unsafe riding conditions. For example, the individual may be directed to a light electric vehicle that has a headlight (or other lights) if the individual desires to reserve or use a light electric vehicle after the sun has set. In other cases, the individual may be notified that reservation or use of all light electric vehicles is temporarily restricted until the unsafe environmental condition has passed.

For example, if the individual wants to reserve or use a light electric vehicle during a rainstorm, the application may provide a notification that reservation or use of light electric vehicles in the particular geographic area is currently restricted due to the detected environmental conditions in that geographic area. In other cases, the notification may provide information that while reservation or use of light electric vehicles is not currently restricted, one or more features or functionalities of the light electric vehicle may be modified. For example, the top speed of a light electric vehicle may be fifteen miles per hour during good weather but may be capped at eight miles per hour during inclement weather.

The application executing on the computing device of the individual may also prevent the individual from reserving or accessing a light electric vehicle until the rain has stopped. In such cases, notification of the restriction constraints may be provided on the user interface of the application.

In another example, a light electric vehicle management system may send instructions to various light electric vehicles to temporarily electronically and/or mechanically prohibit the light electric vehicle from being reserved and/or used. For example, the light electric vehicle management system may send one or more instructions to an electric scooter that prevents the electric motor of the electric scooter from activating when the individual presses a throttle.

These and other features will be further described below with respect to FIG. 1A-FIG. 5.

FIG. 1A illustrates a system 100 for permitting and restricting access to one or more light electric vehicles according to an example. The system 100 includes a light electric vehicle management system 105 that receives or otherwise determines environmental conditions in a variety of different geographic areas, receives and/or determines the features and capabilities of light electric vehicles in each of those geographic areas and provides instructions regarding restriction constraints to the light electric vehicles based on the environmental conditions and/or features and capabilities of the light electric vehicles. For example, the light electric vehicle management system 105 restricts access to, or otherwise causes the light electric vehicles to be unavailable and/or non-operable based on the environmental conditions and features/capabilities of the light electric vehicles.

In some examples, the light electric vehicle management system 105 includes an environmental condition system 110. The environmental condition system 110 may receive, store and/or determine environmental condition information for a number of different geographic areas. For example, the environmental condition system 110 may receive environmental condition information 135 over a network 130 from a third party information system 140. The third party information system 140 may be a weather service information system or other type of information system that determines and/or provides weather information, sunrise/sunset information and the like.

In another example, the environmental condition system 110 may receive environmental condition information 135 over the network 130 from a light electric vehicle such as, for example, light electric vehicle 150, light electric vehicle 151 and/or light electric vehicle 152. For example, one or more of the light electric vehicles may have one or more sensors or cameras that may be used to detect or otherwise determine current environmental condition information in the geographic area in which it is located. The sensed or determined environmental condition information 135 may then be transmitted, over the network 130 to the environmental condition system 110.

In yet another example, a computing device, such as computing device 160, may be configured to detect and/or receive environmental condition information 135, such as, for example, from the third party information system 140. Once the environmental condition information 135 is received or is otherwise detected by the computing device 160, an application executing on the computing device 160 may transmit the environmental condition information 135 to the environmental condition system 110 over the network 130.

As described above, environmental condition information 135 may include information about one or more factors or conditions that relate to the current weather in a particular geographic area or location, forecast weather conditions in a particular geographic area or location and/or an amount of natural light at a given time in that particular geographic area or location. For example, the weather in a particular geographic area may include, but is not limited to current and/or forecast temperatures in the particular geographic area, current and/or forecast precipitation (e.g., rain, snow, hail etc.) for the particular geographic area, current and/or forecast wind currents/speeds for the particular geographic area, current and/or forecast fog conditions for the particular geographic area and other such weather conditions.

Likewise, environmental condition information 135 may include an amount of natural light at a given time for the particular geographic area may correspond to a particular time period (e.g., time of day, day of the week, week of the month, month of the year) and may be based, at least in part, on the Earth's orbit around the sun. For example in a particular geographic area during the summer, the sun may rise at approximately 5:50 AM and set at approximately 9:05 PM. However, in the winter, the sun may rise at approximately 7:00 AM and set at approximately 4:50 PM.

In an example, the light electric vehicle management system 105 may be responsible for managing light electric vehicles in a variety of different geographic areas or locations. As such, the environmental condition system 110 may be able to track, determine and/or store environmental condition information 135 for a number of different geographic areas simultaneously. Using the environmental condition information 135, the light electric vehicle management system 105 may be able to restrict access to or otherwise provide restriction constraints to some light electric vehicles in a first geographic area while permitting access (or not providing restriction constraints) to some light electric vehicles in a second geographic area and/or in the first geographic area (e.g., depending on determined capability/feature information of each of the light electric vehicles).

For example, some light electric vehicles in a fleet may be located in Denver, Colo. while other light electric vehicles in the fleet may be located in San Francisco, Calif., while still other light electric vehicles may be located in Paris, France. As such, the light electric vehicle management system 105, using information from the environmental condition system 110 (e.g., current or anticipated environmental conditions), may determine whether one or more restriction constraints should be applied to the various light electric vehicles in each of these geographic areas.

In an example, one restriction constraint may be applied to a first light electric vehicle in a particular geographic area while a second restriction constraint may be applied to a second light electric vehicle in the particular geographic area and/or a different geographic area. Each of the first and second restriction constraints may be based, at least in part, on the current and/or anticipated environmental conditions and/or the features/capabilities of the various light electric vehicles.

For example, light electric vehicle 151 and light electric vehicle 152 may be located in San Francisco, Calif. The environmental condition system 110 may determine, based on received environmental condition information 135, that it is currently raining in San Francisco. The light electric vehicle management system 105 may determine, using light electric vehicle information system 115 (described in more detail below) that light electric vehicle 151 has rain-capable tires and that light electric vehicle 152 does not have rain-capable tires. Accordingly, light electric vehicle management system 105 may provide a first restriction constraint to the light electric vehicle 151 (e.g., limiting a top speed of the light electric vehicle 151, but not restricting access to or use of the light electric vehicle 151) and may provide a second, different restriction constraint to the light electric vehicle 152 (e.g., taking the light electric vehicle 152 offline or otherwise changing a reservation availability state of the light electric vehicle 152 from available to unavailable).

As briefly described above, the electric vehicle management system 105 may also include a light electric vehicle information system 115. The light electric vehicle information system 115 receives, determines and/or stores capability/feature information 145 from one or more light electric vehicles. For example, the light electric vehicle management system 105 may include an application programming interface (API) that enables a light electric vehicle, such as, for example, light electric vehicle 150, light electric vehicle 151 and/or light electric vehicle 152 to connect to or otherwise communicate with the light electric vehicle management system 105. Using the API, each light electric vehicle may provide its own capability/feature information 145 to the light electric vehicle management system 115 over the network 130. When this information is received, the light electric vehicle manage information system 115 may store the capability/feature information 145 of each light electric vehicle.

The light electric vehicle management system 105 may receive capability/feature information 145 from a number of different light electric vehicles. These light electric vehicles may be located in the same geographic area or in different geographic areas. For example, light electric vehicle 150, light electric vehicle 151 and light electric vehicle 152 may all be located in San Francisco, Calif. In another example, light electric vehicle 150 may be located in Denver, Colo. while light electric vehicle 151 and light electric vehicle 152 are located in San Francisco, Calif.

The capability/feature information 145 may include information about one or features of the particular light electric vehicle. For example, the capability/feature information 145 may indicate whether the light electric vehicle is an electric scooter, an electric bicycle or some other type of electric vehicle. Additionally, the capability/feature information 145 may include information as to whether the light electric vehicle includes a headlight or other such illumination device, the size and/or type of tires on the light electric vehicle (e.g., whether the light electric vehicle has rain-capable tires, snow-capable tires, etc.), the type of brakes used by the light electric vehicle and so on. The capability/feature information 145 may also include information about a vendor that distributes the light electric vehicle, the manufacturer of the light electric vehicle, a hardware and/or software version or profile of the light electric vehicle and so on.

In an example, each light electric vehicle may have different capabilities or features. For example, light electric vehicle 151 may have a first set of capabilities (e.g., higher speed) and features (e.g., a headlight, a particular type of tire, a particular type of brake, a particular software or hardware version, etc.) while light electric vehicle 152 has a second set of capabilities and features. In another example, each light electric vehicle may have the same or similar capabilities and features.

The different capabilities and features of the light electric vehicles may be due to the light electric vehicles being produced by different manufactures. In another example, light electric vehicles may be provided by different companies and/or individuals but may be available for reservation and use on a single platform (e.g., the light electric vehicle management system 105). Additionally, overtime, light electric vehicles in a fleet may be comprised of newer models and older models. As a result, each light electric vehicle may have different capabilities and features. As such, knowledge about the hardware and/or software profiles of the light electric vehicles may be used to ensure the light electric vehicle can communicate with and receive instructions from the light electric vehicle management system 105 via the API.

The capability/feature information 145 may also include an operating state of a particular light electric vehicle. For example, the capability/feature information 145 may include information about a current state of charge of a rechargeable battery of the light electric vehicle, a determined efficiency of the rechargeable battery, a maintenance status of the light electric vehicle, current tire pressure of the light electric vehicle, braking/stopping efficiency of the light electric vehicle, and/or a determined efficiency of an electric assist motor of the light electric vehicle. Although specific capabilities and features are mentioned, it is contemplated that the light electric vehicle management system 105 may receive various types of capability, status and feature information from a light electric vehicle to determine, based on received environmental condition information 135, whether to restrict access to, alter capabilities of, or otherwise provide one or more restriction constraints to a particular light electric vehicle or various light electric vehicles in a particular geographic area or various geographic areas.

For example, light electric vehicle 151 and light electric vehicle 152 may be located in San Francisco, Calif. The capability/feature information 145 associated with light electric vehicle 151 may indicate that light electric vehicle 151 has rain-capable tires. Likewise, the capability/feature information 145 associated with light electric vehicle 152 may indicate that light electric vehicle 152 has normal tires (e.g., light electric vehicle 152 does not have rain-capable tires). Thus, when the environmental condition system 110 determines, based on received environmental condition information 135, that it is raining or is forecast to rain in San Francisco, Calif., the light electric vehicle management system 105 may determine, using light electric vehicle information system 115, what restriction constraints (if any) should be provided to which light electric vehicles.

Continuing with the example from above, light electric vehicle management system 105 may provide a first restriction constraint to the light electric vehicle 151 by providing instructions to the light electric vehicle 151 that limit its top speed, but does not restrict access to or use of the light electric vehicle 151. Likewise light electric vehicle management system 105 may provide a second, different restriction constraint to the light electric vehicle 152 by preventing the light electric vehicle 152 from being reserved, taking the light electric vehicle 152 offline or otherwise changing a reservation availability state of the light electric vehicle 152 from available to unavailable (e.g., preventing the light electric vehicle 152 from being accessed, reserved, used or ridden during the detected or anticipated environmental condition).

In some examples, the light electric vehicle management system 105 may receive, over the network 130, environmental condition information 135 for a particular geographic area from the third party information system 140 or from some other source such as previously described. Once the environmental condition information 135 is received, the light electric vehicle management system 105 may determine which light electric vehicles are in or are otherwise associated with that particular geographic area.

For example, the environmental condition system 110 may receive environmental condition information 135 indicating that it is currently snowing (or is forecast to snow) in Denver, Colo. When the environmental condition information 135 is received, the light electric vehicle management system 105 may utilize the light electric vehicle information system 115 to determine which light electric vehicles are in or otherwise associated with the Denver, Colo. area. In an example, a current or last known location of a light electric vehicle may be stored by the light electric vehicle information system 115. In another example, the light electric vehicle management system 115 may request location information from one or more light electric vehicles during periodic intervals. In yet another example, a light electric vehicle may provide its current location to the light electric vehicle information system 115 periodically and/or when the light electric vehicle is being used or when a use period for the light electric vehicle has ended.

When the light electric vehicles for that particular geographic area are identified, the light electric vehicle information system 115 may request capability/feature information 145 from the identified light electric vehicles. In another example, the light electric vehicle information system 115 may have previously received and/or stored the capability/feature information 145 for each light electric vehicle in a fleet. In yet another example, each light electric vehicle in a fleet may automatically or periodically provide capability/feature information 145 to the light electric vehicle information system 115.

Continuing with the example above, when the environmental condition information 135 indicates that it is snowing or is forecast to snow in Denver, Colo., the light electric vehicle management system 105 and/or the light electric vehicle information system 115 may determine or identify light electric vehicles in that geographic area. For example, the light electric vehicle management system 105 may determine that light electric vehicle 150, light electric vehicle 151 and light electric vehicle 152 are all in or around Denver, Colo. As such, capability and/or feature information for light electric vehicle 150, light electric vehicle 151 and light electric vehicle 152 may be identified or determined.

For example, the light electric vehicle information system 115 may request capability/feature information 145 from light electric vehicle 150, light electric vehicle 151 and light electric vehicle 152. In another example, the light electric vehicle information system 115 may have stored previously received or determined capability/feature information 145 for each of the light electric vehicles. In yet another example, some capability/feature information 145 may be stored by the light electric vehicle information system 115 (e.g., whether the light electric vehicle has a headlight or other illumination device, the type of brakes, software version, hardware version, tire size, etc.) while other capability/feature information 145 (e.g., current battery state, current tire pressure, maintenance status, rechargeable battery efficiency, electric assist motor efficiency, typical stopping distance when applying brakes, etc.) may be requested or otherwise received by the light electric vehicle information system 115 in real-time or substantially real-time or in response to some other received request (e.g., an availability request 155, detected or anticipated environmental conditions, etc.).

When the capability/feature information 145 is received, the light electric vehicle management system 105 may determine which light electric vehicles have capabilities or features that would mitigate potentially dangerous riding conditions caused by inclement weather or other environmental conditions (e.g., riding at night). The light electric vehicle management system 105 may then restrict or prohibit access to one or more light electric vehicles by providing instructions that indicate one or more restrictions constraints (if any) that are to be applied to the light electric vehicles based on the determined or identified features/capabilities.

Continuing with the example above, if it was determined, using the capability/feature information 145 received from light electric vehicle 151 and light electric vehicle 152, that light electric vehicle 151 has larger tires that are suitable for riding in snow, the light electric vehicle management system 105 may not provide any restriction constraints to the light electric vehicle 151. Thus, a reservation state or an availability state of the light electric vehicle 151 may remain unchanged while it is snowing in Denver, Colo. However, because the capability/feature information 145 received from light electric vehicle 152 indicates that the light electric vehicle 152 has standard tires, the light electric vehicle management system 105 may provide restriction constraint instructions to the light electric vehicle 152. For example, the restriction constraint instructions may limit a top speed of the light electric vehicle 152. In another example, the restriction constraint instructions may change a reservation availability state (whether the light electric vehicle can be reserved, such as, for example using an application executing on a computing device) and/or an availability state (whether the light electric vehicle can be accessed, reserved and/or used) from available to unavailable while the detected environmental condition is occurring.

However, it may also be determined that although the light electric vehicle 151 has larger tires that are more suitable for riding in the snow, the individual wants to ride the light electric vehicle at 7:00 PM (e.g., the light electric vehicle management system 105 may determine that it is nighttime in Denver, Colo.). So in addition to the snow, it is dark outside. The darkness may also cause potential unsafe riding conditions. As such, the light electric vehicle management system 105 may also determine, using the capability/feature information 145 received from the various light electric vehicles, that although light electric vehicle 151 has larger tires that are suitable for riding in the snow, the light electric vehicle 151 does not have headlight or other illumination device. As such, the light electric vehicle management system 105 may provide restriction constraint instructions to the light electric vehicle 151 that changes an availability state of the light electric vehicle 151 from available to unavailable. Alternatively, restriction constraint instructions provided by the light electric vehicle management system 105 may maintain the availability state of the light electric vehicle 151 but may restrict one or more operating parameters (e.g., a top speed) of the light electric vehicle 151 due to the lack of an illumination device.

In an example, the capability/feature information 145 may indicate that a particular light electric vehicle has certain capabilities and features that would mitigate dangerous riding conditions caused by certain environmental conditions. For example and as described above, if an individual wants to ride a light electric vehicle at night, light electric vehicles having headlights or other illumination devices would be identified, their locations provided to the individual and restriction constraints may not be set for the identified light electric vehicles.

However, prior to allowing the individual to use a particular light electric vehicle, the light electric vehicle management system 105 may detect or otherwise determine a maintenance status of the light electric vehicle. For example, the light electric vehicle management system 105 may determine whether the headlight or other illumination device of the light electric vehicle is currently functional. If so, an availability state of the light electric vehicle may remain unchanged (e.g., the availability state of the light electric vehicle is set to available). However, if the headlight is not currently functional, the availability state of the light electric vehicle may be changed from available to unavailable until the light electric vehicle can be serviced and/or until the detected environmental condition has passed. For example, if the light electric vehicle has a headlight but the headlight is not currently functional, the light electric vehicle may be available during daylight hours but be unavailable during nighttime hours. Thus, although a light electric vehicle may have some capabilities or features that would mitigate unsafe riding conditions caused by detected or anticipated environmental conditions, restriction constraints that change one or more operating parameters of the light electric vehicle may still be provided to the light electric vehicle in order to help ensure safer riding conditions.

In some examples, an environmental condition may be confined to a certain part or certain zones of a particular geographic area. As such, the restriction constraints may be applied to electric vehicles that are in those zones and/or enter those zones. For example, it may be snowing on the north side of Denver, Colo. but not snowing (or maybe raining) on the south side of Denver, Colo. As such, one or more restriction constraints may be applied to various light electric vehicles located (or entering) the north side of Denver, Colo., while one or more different (or similar) restriction constraints may be applied to various light electric vehicles located (or entering) the south side of Denver, Colo. For example, restriction constraints can be applied to one or more light electric vehicles and/or removed from one or more light electric vehicles in real-time or substantially real-time based on a detected direction, a current location and/or anticipated destination of the one or more light electric vehicles and on the detected or forecast environmental conditions in a particular geographic area or location.

The light electric vehicle management system 105 may also include an instruction management system 120. As will be described in more detail with respect to FIG. 1B, the instruction management system 120 may send restriction constraint(s) 165 to one or more light electric vehicles. These instructions may be used to alter an availability state of the light electric vehicles and/or the capabilities (e.g., top speed) of the light electric vehicles based on anticipated, detected or determined environmental conditions.

The light electric vehicle management system 105 may also include a profile management system 125. The profile management system 125 may receive and/or store profile data about individuals that reserve and/or request to ride a light electric vehicle. For example, an individual may, using a computing device 160, submit an availability request 155 to the light electric vehicle management system 105 through the network 130. The availability request 155 may include profile information and/or other identifying information about the requesting individual. For example, the profile information may include a riding experience level of the individual (e.g., whether the individual is a beginning rider, an intermediate rider, an advanced rider), typical riding habits of the individual and so on. In examples in which the individual has submitted profile data, the data is securely stored. In another example, an individual is not required to provide any personal information. In yet another example, the individual can choose to provide profile information.

In some examples, the light electric vehicle management system 105 may provide restriction constraints that limit or allow access to one or more light electric vehicles and/or alter performance capabilities (e.g., top speed) of a light electric vehicle based on the environmental condition information 135 and/or the rider profile information. For example, the light electric vehicle management system 105 may determine, using the profile management system 125, that the individual associated with the computing device 160 that provided the availability request 155 or is otherwise requesting access to a light electric vehicle (e.g., by walking up to the light electric vehicle on the street and attempting to reserve or use the light electric vehicle) has ridden other light electric vehicles over a threshold number of times (e.g., twenty). Accordingly, the light electric vehicle management system 105 may classify the individual as having intermediate or advanced experience.

The light electric vehicle management system 105 may also determine, using information contained in the profile management system 125, that of those twenty rides, ten have been at night and five have been during inclement weather (e.g., rain). As such, the light electric vehicle management system 105 may determine that one or more capabilities of the light electric vehicle should not be limited because this particular individual has sufficient riding experience at night and/or during inclement weather. However, as discussed above, the light electric vehicle management system 105 may still provide one or more restriction constraints to certain light electric vehicles based on the capability/features information of the light electric vehicles.

Likewise, profile information of a requesting individual may indicate that the particular individual has little to no riding experience, especially during times at which potentially dangerous riding conditions may exist due to anticipated, detected or determined environmental conditions in a geographic area associated with the individual. As such, the light electric vehicle management system 105 may provide restriction constraints to the light electric vehicle that prohibits the individual from reserving or using the particular light electric vehicle. In other examples, the restriction constraints provided by the light electric vehicle management system 105 may not change an availability state of the light electric vehicle but will limit the performance characteristics (e.g., top speed) of the light electric vehicle.

In some examples, the restriction constraints provided by the light electric vehicle management system 105 may be arranged in a tier or other hierarchy. The tier or hierarchy may be based, at least in part, on a riding experience level of the individual. For example, restriction constraints may not be applied to light electric vehicles being reserved or used by an experienced rider. However, a speed restriction constraint may be provided to a light electric vehicle reserved or used by an inexperienced rider that is riding the light electric vehicle at night. In yet other cases, the electric vehicle management system 105 may provide restriction constraints that limit access to light electric vehicles and/or alter one or more capabilities of the light electric vehicle during certain environmental conditions regardless of the riding experience of the requesting individual.

As briefly discussed above, the electric vehicle management system 105 may receive an availability request 155 from a computing device 160 associated with an individual. When the availability request 155 is received, the light electric vehicle management system 105 may determine a geographic area of the individual, determine current and/or forecast environmental condition information in the geographic area, identify one or more light electric vehicles in that geographic location, determine the capabilities and features of the light electric vehicles in the geographic area and identify which light electric vehicles should be made available to the individual. In some examples and as previously described, profile information of the individual may be used to make the determination as to which light electric vehicles should be made available to the individual. As will be described in more detail below, when one or more light electric vehicles are identified, the location of the identified light electric vehicles may be provided to the computing device 160 associated with the individual.

Figure 1B:
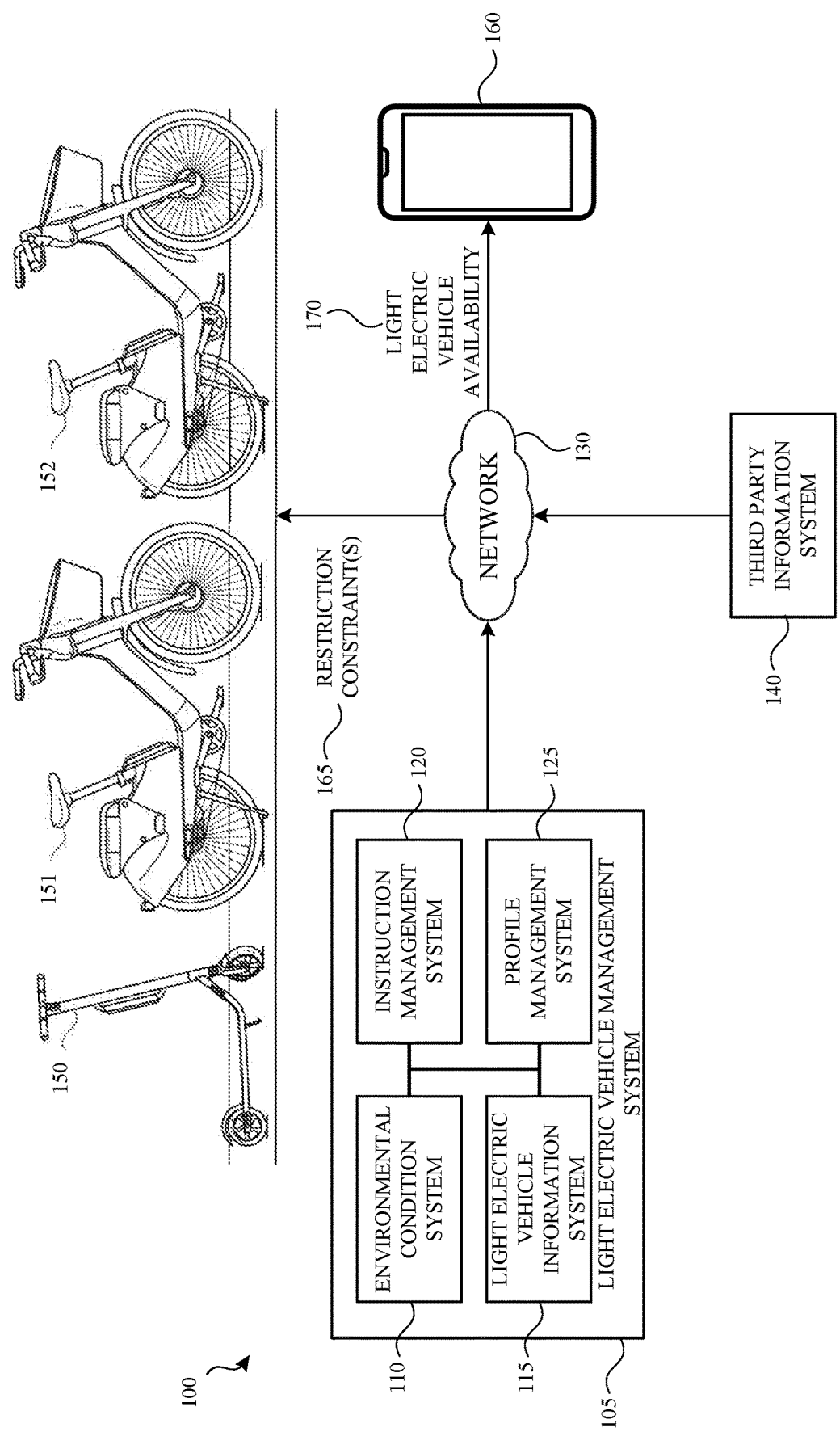
FIG. 1B illustrates the system of FIG. 1A in which availability and/or capability instructions are transmitted to the one or more light electric vehicles according to an example.

For example and referring to FIG. 1B, the light electric vehicle management system 105 may send light electric vehicle availability information 170 to a computing device 160 associated with a requesting individual. Likewise, the light electric vehicle management system 105 may send restriction constraint(s) 165 or restriction constraint instructions to one or more light electric vehicles.

For example, if it is snowing in Denver, Colo., the light electric vehicle management system 105 may send restriction constraint(s) 165 to light electric vehicle 150 and light electric vehicle 152 that limits, restricts or changes an availability state or capabilities of these light electric vehicles during the inclement weather since the capability/feature information 145 of these light electric vehicles indicate that these light electric vehicles don't have tires that would mitigate potentially dangerous riding conditions caused by the snow. However, since the capability/feature information 145 received from light electric vehicle 151 indicates that it has wider rims/tires, the light electric vehicle management system 105 may forgo providing restriction constraint(s) 165 to the light electric vehicle 151 that prohibit the use and/or performance characteristics of the light electric vehicle 151.

In some cases, the restriction constraint(s) 165 may be instructions that alter one or more mechanical features of the light electric vehicle and/or alter one or more electronic features of the light electric vehicle. For example, the restriction constraint(s) 165 may include an instruction that locks a kickstand of the light electric vehicle, prohibits a locking mechanism of the light electric vehicle from being unlocked, prohibits a pedal of the light electric vehicle from being moved, prohibits an electric assist motor for activating, etc. In another example, the restriction constraint(s) 165 may include instructions that limit one or more software or electronic features of the light electric vehicles. For example, the restriction constraint(s) 165 may prevent the light electric vehicle from being reserved or used by an individual. In another example, the restriction constraint(s) 165 may prevent the activation of an electric assist motor.

The restriction constraint(s) 165 may also be used to limit or restrict performance characteristics of the light electric vehicle. For example, depending on anticipated, detected or determined environmental conditions in a geographic area, the restriction constraint(s) 165 may limit or alter a top speed of the light electric vehicle during the detected environmental condition.

As shown in FIG. 1B, the light electric vehicle management system 105 may also send light electric vehicle availability 170 to the computing device 160 associated with the requesting individual. The light electric vehicle availability 170 may be used to show the location and/or availability of one or more light electric vehicles on a user interface of the computing device 160 such as shown and described with respect to FIG. 2A-FIG. 2D. In other examples, the light electric vehicle availability 170 information may also be sent to the computing device 160 in response to an individual walking up to a light electric vehicle on the street and attempting to reserve or otherwise use the light electric vehicle without first determining a location of one or more available light electric vehicles.

That is, in the above example, the individual did not access an application executing on the computing device 160 to determine a location of one or more currently available light electric vehicles and reserve the electric vehicle prior to approaching/reaching the location of the light electric vehicle. Rather, the individual submitted an availability request 155 (e.g., a reservation request or a use request) using the application on the computing device 160 by approaching the light electric vehicle, using the application to identify the light electric vehicle and submitting the availability request 155 at that time.

In such cases, the light electric vehicle management system 105 may determine, based on the capability/feature information 145 of the light electric vehicle, the profile information of the individual and/or the environmental condition information 135, whether the light electric vehicle can be reserved and/or used by the individual. In some examples, this determination is made in real-time or substantially real-time (e.g., when the availability request 155 is received). In other examples, the determination as to whether a particular light electric vehicle is available is made when environmental condition information 135 is determined and/or received. If access to the light electric vehicle is not restricted, the light electric vehicle may be reserved and used by the individual.

Figure 2A:
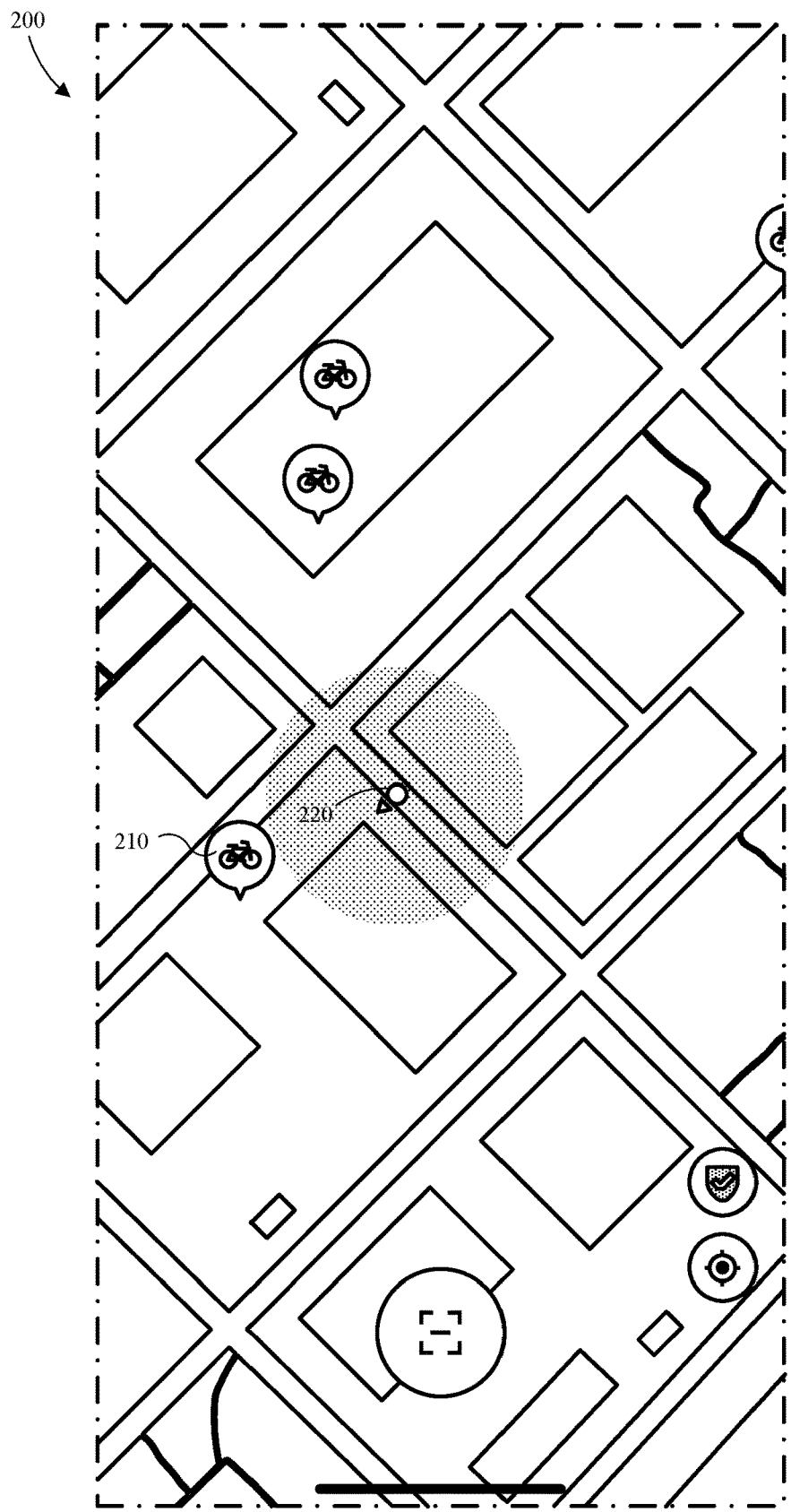
FIG. 2A illustrates an example user interface for a computing device that shows a location of one or more light electric vehicles that are available for reservation or use according to an example.

FIG. 2A illustrates an example user interface 200 for a computing device that shows a location of one or more light electric vehicles (indicated by icon 210) that are available for use according to an example. In some examples, the user interface 200 may be provided on the computing device 160 shown in FIG. 1A and FIG. 1B. For example, the user interface 200 may be generated and displayed on the computing device 160 in response to an individual submitting an availability request 155 to the light electric vehicle management system 105.

When the availability request 155 is received, the light electric vehicle management system 105 may determine a current location of the computing device 160 and identify one or more light electric vehicles in a geographic area associated with the current location of the computing device 160. The location of available light electric vehicles may then be provided on the user interface 200. For example, as shown in FIG. 2A, the current location of the individual is shown by the indicator 220 while the locations of available light electric vehicles are shown by icons 210.

Figure 2B:
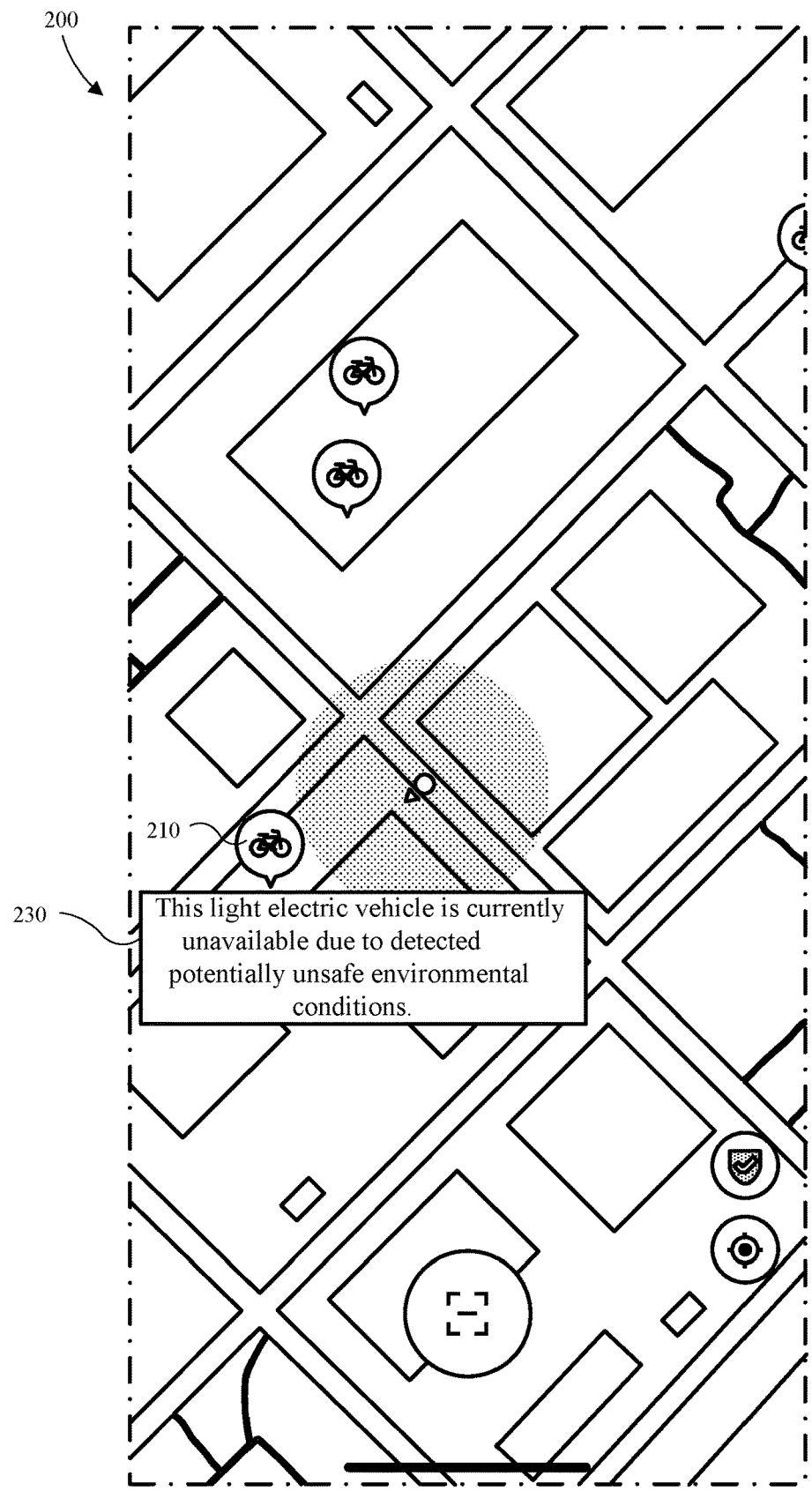
FIG. 2B illustrates the example user interface of FIG. 2A in which a notification is provided that a particular light electric vehicle is not currently available for reservation or use based on potential unsafe riding conditions caused by environmental conditions in a geographic area according to an example.

FIG. 2B illustrates the example user interface 200 of FIG. 2A in which a notification 230 is provided that a particular light electric vehicle 210 is currently not available for use based on potential unsafe riding conditions caused by environmental conditions in the geographic area according to an example. In some examples, the user interface 200 may be provided in response to a received availability request 155 (FIG. 1A) from a computing device 160 (FIG. 1A). For example, the user interface 200 and corresponding notification 230 may be provided to the computing device 160 when an individual accesses an application executing on the computing device 160 and submits the availability request 155. The individual may access an application executing on the computing device 160 and cause the computing device 160 to send the availability request 155 to the light electric vehicle management system 105 when the individual is standing near or next to a particular light electric vehicle. Additionally, the availability request 155 may be sent when the individual is remote from any light electric vehicle in the geographic area.

When the light electric vehicle management system 105 receives the availability request 155, the light electric vehicle management system 105 may determine a location of the computing device 160 associated with the individual, determine and/or receive current or forecast environmental condition information (e.g., using environmental condition information 135), determine capability and feature information (e.g., using capability/feature information 145) of light electric vehicles that are associated with the location of the individual and determine whether or not to restrict access to one or more of the identified light electric vehicles and/or change one or more operating parameters of the light electric vehicles. In the present example, the notification 230 indicates that the light electric vehicle closest to the current location of the individual is currently unavailable due to detected potentially unsafe riding conditions caused by detected or anticipated environmental conditions.

Although the notification 230 indicates that the light electric vehicle at the current location is currently unavailable due to potential unsafe riding conditions caused by environmental conditions, other light electric vehicles may be available for use because they have particular features and/or capabilities that mitigate the potentially unsafe riding conditions.

Figure 2C:
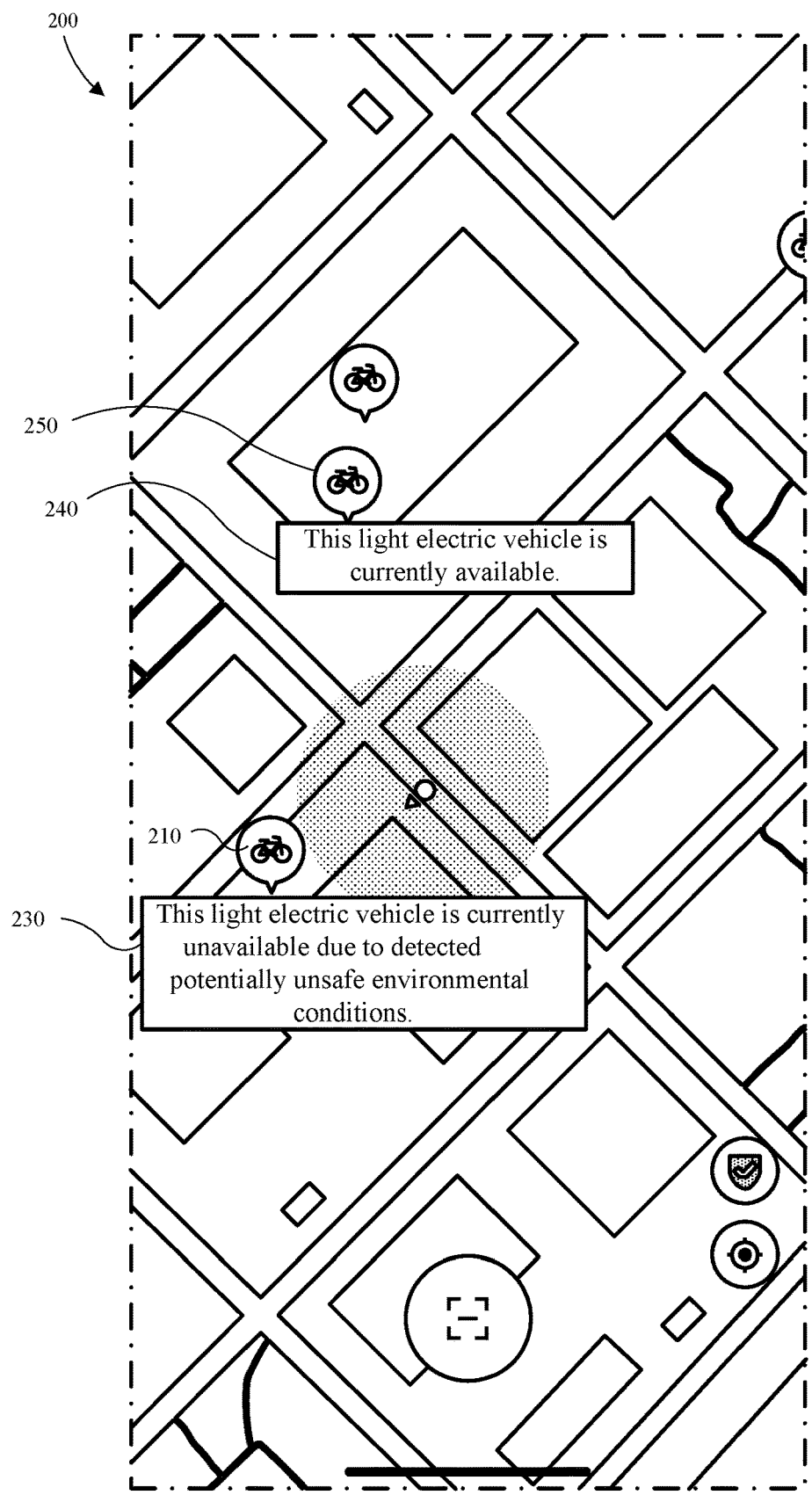
FIG. 2C illustrates the example user interface of FIG. 2A in which a first indication is provided that a first light electric vehicle is not currently available for reservation or use due to potential unsafe riding conditions caused by detected current or anticipated environmental conditions in a geographic area while a second notification indicates that a second light electric vehicle is available for reservation or use despite the detected current or anticipated environmental conditions in the geographic area according to an example.

For example and referring to FIG. 2C, FIG. 2C illustrates the example user interface 200 of FIG. 2A in which a first indication 230 is provided that a first light electric vehicle 210 is not currently available for use and a second indication 240 is provided that a second light electric vehicle 250 is available for use despite the detected environmental condition in the geographic area associated with the requesting individual. As with other examples described herein, the light electric vehicle indicated as unavailable may be based on one or more of the received or determined environmental condition information 135, capability/feature information 145 of the electric vehicle and/or rider profile information received or otherwise determined by a received availability request 155. Likewise, the second indication 240 that the second light electric vehicle is available, despite the determined or forecast environmental condition information, may be based on one or more of the rider profile information and/or the capability/feature information 145 of the second light electric vehicle.

Although FIG. 2B and FIG. 2C illustrate various text-based notifications (e.g., notification 230 and notification 240), the user interface may provide visual indicators or other such elements that show light electric vehicles that are available based on one or more of the received or determined environmental condition information 135, the capability/feature information 145 of light electric vehicles in a particular geographic area and/or rider profile information received or otherwise determined by a received availability request 155. For example, the user interface 200 may only display light electric vehicles that have capabilities or features that would mitigate the potentially unsafe riding conditions caused by the determined current or forecast environmental conditions in the geographic region.

In yet other examples, a notification, such as notification 230, may be provided on the user interface 200 when an individual is within a threshold distance of a light electric vehicle that has been taken offline or otherwise removed from service by the light electric vehicle management system 105. The notification 230 may also be provided on the user interface 200 when the individual attempts to reserve or use the light electric vehicle while standing by the light electric vehicle. For example, the individual may access the application while standing by a light electric vehicle. However, due to the potentially unsafe riding conditions caused by the environmental conditions, the features/capabilities of the light electric vehicle and/or the experience level of the requesting individual, that particular light electric vehicle may be unavailable for use. If a notification is not provided as to why the individual cannot reserve or use the light electric vehicle, the individual may become frustrated and stop using the light electric vehicle platform. As such, it may be beneficial to provide some type of notification to the individual as to why the individual cannot reserve or use the light electric vehicle.

Although specific examples of notifications are provided, the notifications may have any number of different explanations. Further, the notifications may indicate an estimated time as to when the potentially unsafe riding condition will be over. In some cases, this information may be based on received environmental condition information 135. For example, the environmental condition information 135 may indicate that it is supposed to rain from 3:00 PM to 5:00 PM in San Francisco, Calif. Therefore, the notification may indicate that one or more light electric vehicles are or will be unavailable during this time period but will be available once the environmental condition has passed.

In other examples, a notification may be provided that a functionality and/or an ability of the light electric vehicle is currently (or will be) altered based on potentially unsafe riding conditions caused by the environmental conditions. For example, the notification may indicate that a top speed of the light electric vehicle is lower (or will be lower) because of detected and/or received environmental condition information.

Figure 2D:
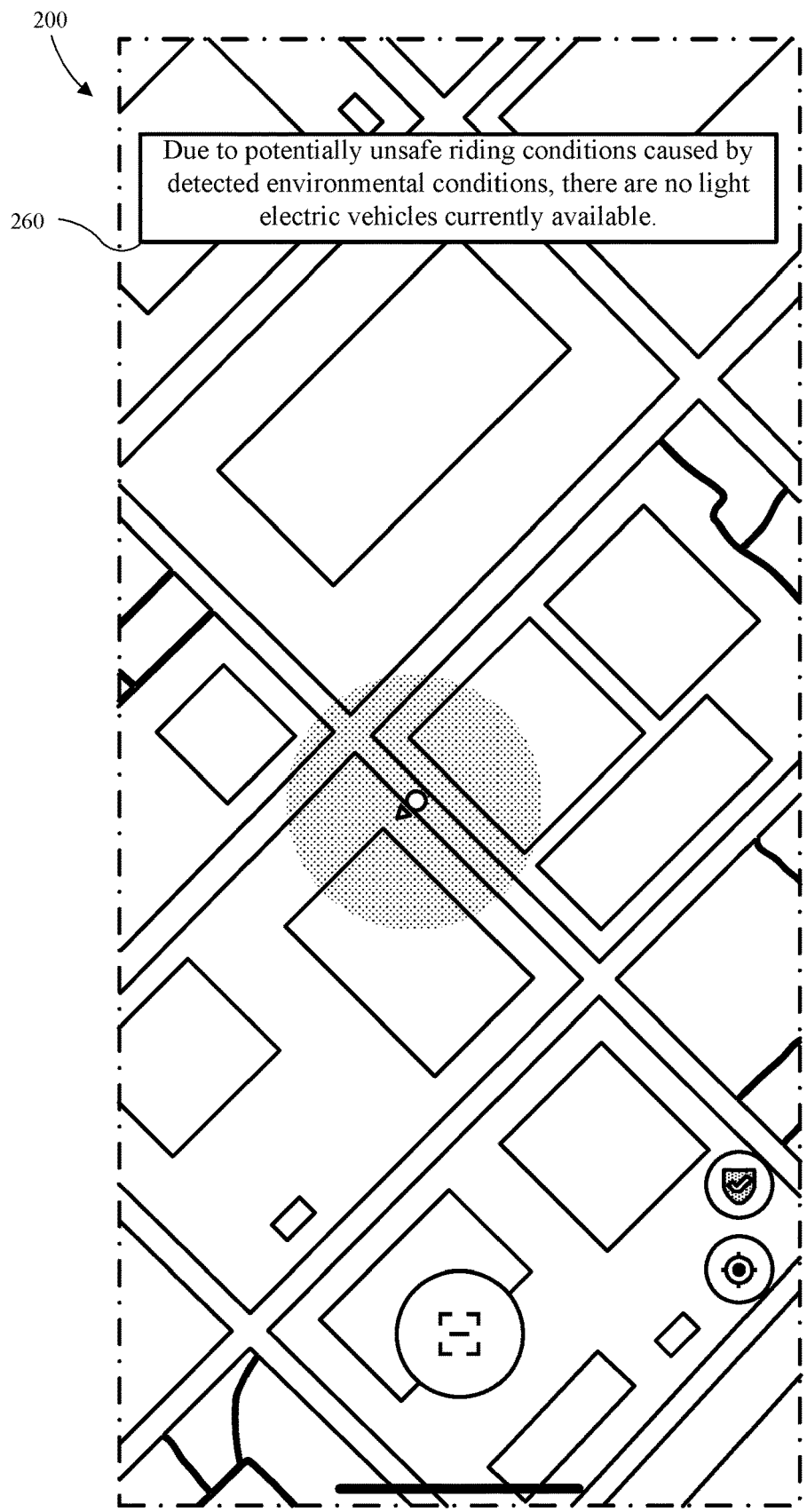
FIG. 2D illustrates the example user interface of FIG. 2A in which a notification is provided that indicates that light electric vehicles are not currently available for reservation or use due to potential unsafe riding conditions caused by environmental conditions in a geographic area according to an example.

FIG. 2D illustrates the example user interface 200 of FIG. 2A in which a notification 260 is provided that indicates that light electric vehicles are not currently available for reservation or use due to potential unsafe riding conditions caused by detected or anticipated environmental conditions. In the example shown in FIG. 2D, although the location of the individual is determined and shown on the user interface 200, the location of all light electric vehicles have been removed from the user interface 200 due to the potentially unsafe riding conditions caused by current or anticipated environmental conditions in the geographic region. However, once the environmental conditions have cleared, the user interface 200 may once again display the locations of available light electric vehicles (similar to what is shown in FIG. 2A).

Figure 3:
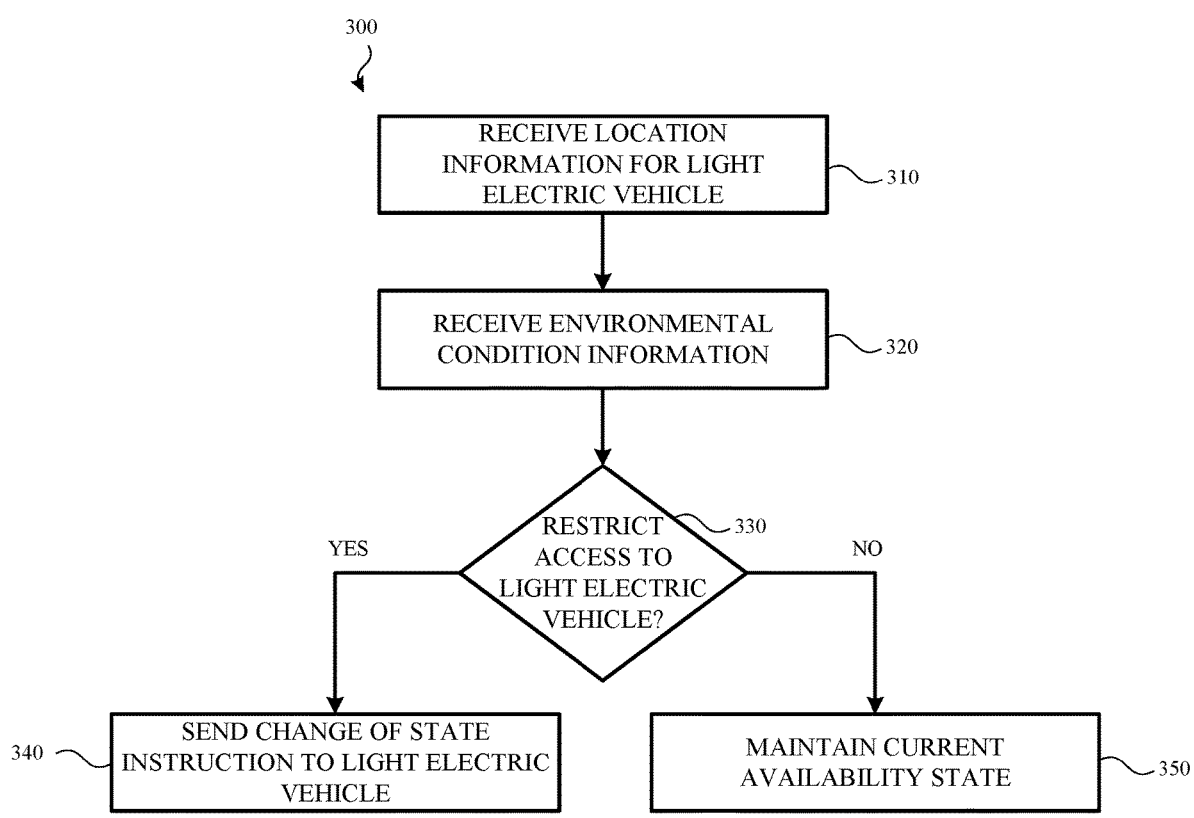
FIG. 3 illustrates a method for altering an availability state of a light electric vehicle according to an example.

FIG. 3 illustrates a method 300 for altering an availability state of a light electric vehicle according to an example. In some examples, the method 300 may be performed by one or more components or systems of the system 100 shown and described with respect to FIG. 1A and FIG. 1B. For example, the light electric vehicle management system 105 may perform or cause the performance of the various operations described below.

According to method 300, location information for a light electric vehicle is received (310) and/or determined. In an example, the location information of the light electric vehicle is received and/or determined in response to a received light electric vehicle availability request (e.g., availability request 155). In another example, the location information for the light electric vehicle is received when an individual has stopped riding or using the light electric vehicle. In yet another example, the location information of the light electric vehicle may be received from the light electric vehicle at periodic intervals, in real-time or substantially real-time.

The location information may also be received or requested by the light electric vehicle management system when environmental condition information (e.g., environmental condition information 135) is detected or received (320) that indicates inclement weather is forecast or is occurring in a particular geographic area. For example, if the environmental condition information indicates that inclement weather is expected or is occurring in Denver, Colo., the light electric vehicle management system may determine or otherwise identify which light electric vehicles are located in or are otherwise associated with Denver, Colo. As such, operation 310 and operation 320 may occur in any order and/or may be received simultaneously, substantially simultaneously and/or in real-time or substantially real-time.

Once the above-mentioned information is received by the light electric vehicle management system, the light electric vehicle management system determines (330) whether to restrict access to one or more light electric vehicles in a particular geographic location. As explained above, the determination may be based on a combination of factors including the environmental condition information, rider profile information of a requesting individual and/or capability/features information of the light electric vehicle.

If the light electric vehicle management system determines that access to the light electric vehicle should be restricted, the light electric vehicle management system sends (340) instructions (e.g., restriction constraint(s) 165) to the light electric vehicle that changes one or more of an availability state of the light electric vehicle and/or performance characteristics of the light electric vehicle. However, if it is determined that access to the light electric vehicle does not need to be restricted (e.g., because the light electric vehicle has capabilities or features that mitigate potentially unsafe riding conditions caused by the environmental conditions and/or the rider profile information indicates that the requesting individual has experience riding in the particular environmental conditions), the availability state of the light electric vehicle is maintained (350). As such, the light electric vehicle may be accessed and used by the requesting individual.

Figure 4:
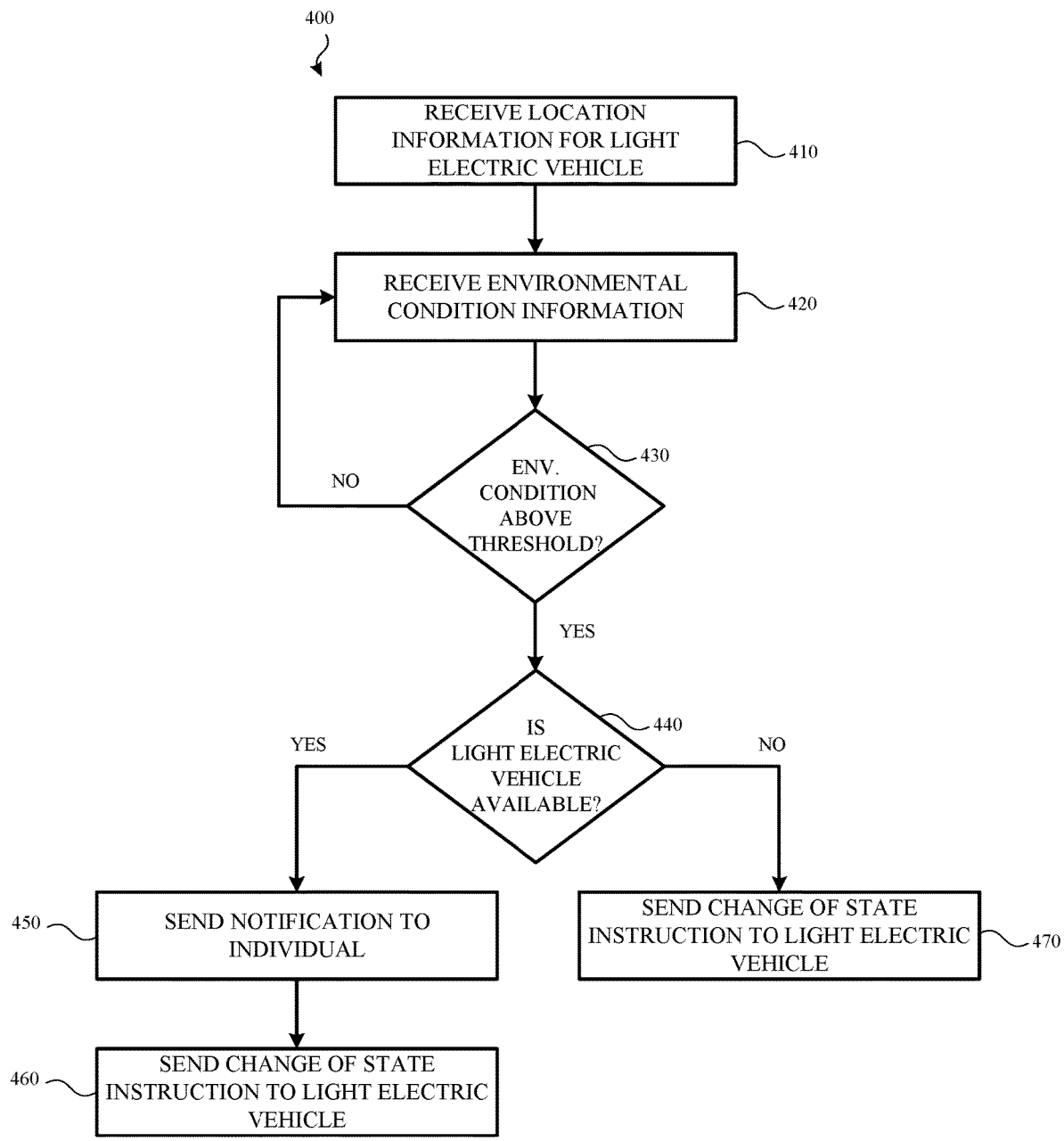
FIG. 4 illustrates a method for altering one or more capabilities of a light electric vehicle due to detected environmental conditions associated with a location of the light electric vehicle according to an example.

FIG. 4 illustrates a method 400 for altering one or more capabilities of a light electric vehicle due to detected or anticipated environmental conditions associated with a location of the light electric vehicle according to one or more examples. In some examples, the method 400 may be performed by one or more components or systems of the system 100 shown and described with respect to FIG. 1A and FIG. 1B. For example, the light electric vehicle management system 105 may perform or cause the performance of the various operations described below.

Method 400 begins when location information of a light electric vehicle is received (410). As described above, the location information of the light electric vehicle may be received and/or determined in a number of different ways and/or in response to a number of factors. These include receiving a light electric vehicle availability request, in response to an individual completing a use period or reaching a desired destination while using the light electric vehicle, and/or receiving light electric vehicle location information at periodic intervals, in real-time or substantially real-time. The location information may also be received or requested by the light electric vehicle management system when environmental condition information (e.g., environmental condition information 135) is detected or received (420) such as previously described.

When the location information and environmental condition information is received, a determination (430) is made as to whether a severity of the environmental condition is above a threshold. For example, a determination may be made as to whether the current (or anticipated) environmental condition would cause potentially unsafe riding conditions. For example, extreme heat may cause a rechargeable battery of the light electric vehicle to be less responsive or operate less efficiently. High winds may cause the individual on the light electric vehicle to tip over or crash. Likewise, a heavy rain, fog or snow may cause other unsafe riding conditions for the individual.

However, small rain showers, snow flurries and lower wind speeds may not severely impact the riding safety of the individual. As such, it may be desirable to determine whether the current or anticipated environmental conditions are above an environmental condition threshold and only change the operating state and/or availability state of a light electric vehicle when the current or anticipated environmental conditions are above the threshold. For example and as shown in FIG. 4, if the detected or anticipated environmental conditions are not above the threshold, additional environmental condition information is received (420). Accordingly, the light electric vehicle management system may be configured to continuously or periodically monitor the environmental conditions in that particular geographic area to determine whether or when the environmental conditions reach or exceed the environmental condition threshold.

However, if the environmental condition information indicates that the environmental condition is above the environmental condition threshold, a determination (440) is made as to whether a light electric vehicle is available or is currently being used or is reserved. For example, an individual may be using a light electric vehicle during a period of time when the environmental condition crosses or otherwise exceeds the environmental condition threshold. As such, it may be desirable to first determine whether the light electric vehicle is being used by an individual prior to changing or altering an availability state of the light electric vehicle and/or altering one or more capabilities of the light electric vehicle.

If it is determined that the light electric vehicle is currently being used by an individual, the light electric vehicle management system may send a notification to a computing device associated with the individual and/or to the light electric vehicle that the availability and/or capabilities of the light electric vehicle is going to be changed. In some examples, the notification may provide a time frame at which the availability state or capabilities of the light electric vehicle will be changed. It is also contemplated that the notification may be accompanied by a tactile or haptic notification, an audio notification and/or a visual notification. Additionally, the notification may be provided a number of different times to help ensure the individual is aware of the pending change. In some examples, a change to the availability and/or the capabilities of the light electric vehicle may not be changed until the individual acknowledges the notification (e.g., by requiring that the individual select a displayed or generated user interface feature that indicates the individual has seen and acknowledges the pending change of state of the light electric vehicle).

When the notification is provided and/or acknowledged, the light electric vehicle management system may send (460) a change of state instruction (e.g., restriction constraint(s) 165) to the light electric vehicle. In some examples, the change of state instruction may be an instruction to change an availability state of the electric vehicle from available to unavailable. The change of the state instruction may occur during a ride (in some cases, the individual riding the light electric vehicle may be required to acknowledge the notification that the change of state is occurring) or when a current use period of the light electric vehicle is complete. In other examples, the change of state instruction may be an instruction to alter one or more functions or capabilities of the light electric vehicle. For example, the top speed of the light electric vehicle may be reduced based on the weather and/or time of day/night.

If it is determined (440) that the light electric vehicle is not currently being used, the light electric vehicle management system may send (470) a change of state instruction to the light electric vehicle without providing a notification.

While change of state instructions are provided to the various light electric vehicles based on detected current or forecast adverse environmental conditions, the light electric vehicle management system may also send additional change of state instructions to the light electric vehicles when received environmental condition information indicates that the potential unsafe riding conditions have passed. For example, received environmental condition information 135 may indicate that it has stopped raining, the wind is below a threshold wind speed, the temperate has dropped below a threshold, there is enough daylight for an individual to ride a light electric vehicle without a headlight and so on. In such examples, the light electric vehicle management system may restore the availability and/or remove restrictions on one or more capabilities of the light electric vehicle that were previously altered or restricted. For example, if the top speed of the light electric vehicle was altered or otherwise restricted, the light electric vehicle management system may send an instruction to the light electric vehicle to remove that restriction.

Figure 5:
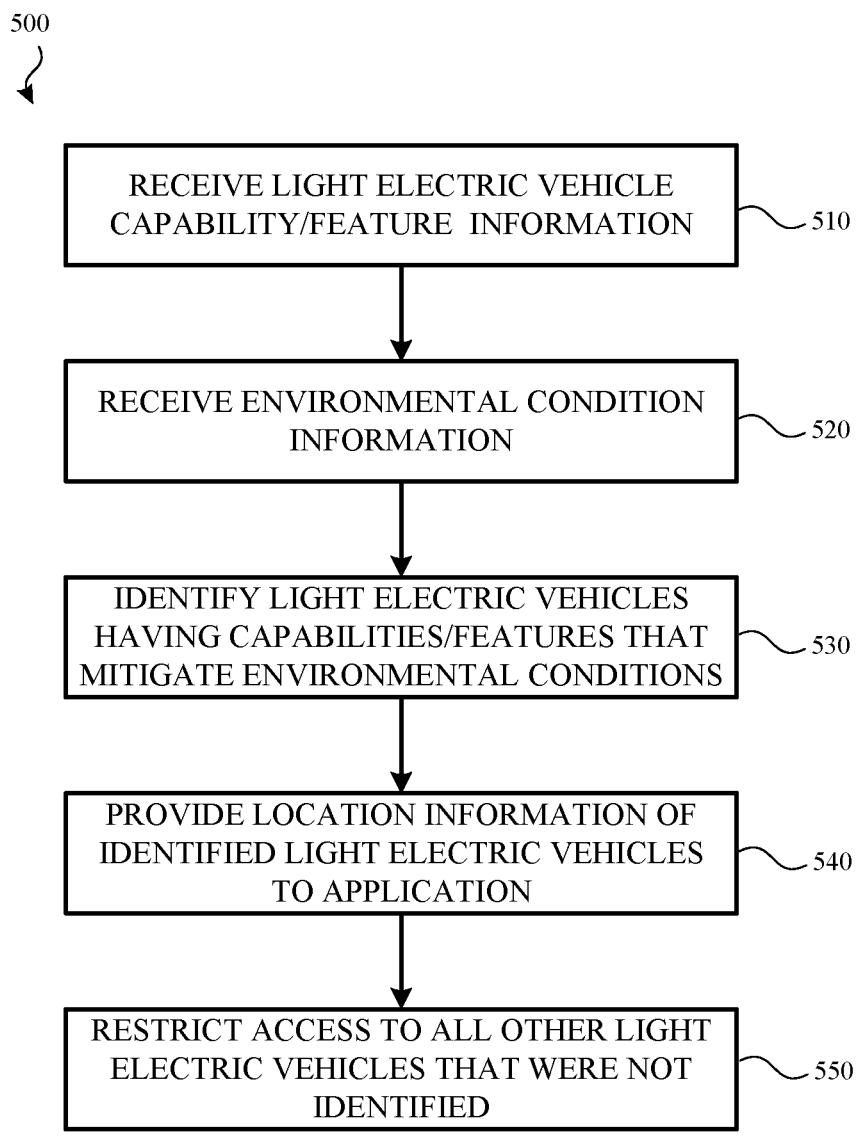
FIG. 5 illustrates a method for selectively altering an availability state of one or more light electric vehicles in a fleet of light electric vehicles according to an example.

FIG. 5 illustrates a method 500 for selectively altering an availability state of one or more light electric vehicles in a fleet of light electric vehicles according to an example. As with method 300 of FIG. 3 and method 400 of FIG. 4, the method 500 may be performed by one or more components or systems of the system 100 shown and described with respect to FIG. 1A and FIG. 1B. For example, the light electric vehicle management system 105 may perform or cause the performance of the various operations described below.

Method 500 begins when the light electric vehicle management system receives (510) and/or determines light electric vehicle capability/feature information from one or more light electric vehicles. In some examples, the light electric vehicle capability/feature information is received and/or determined in response to an availability request (e.g., availability request 155 FIG. 1A), in response to receiving (520) environmental condition information, and/or when an individual completes or terminates a use period or reservation period of the light electric vehicle.

When the light electric vehicle management system receives the light electric vehicle capability/feature information and the environmental condition information, the light electric vehicle management system identifies (530) which light electric vehicles have capabilities and/or features that could mitigate potentially unsafe riding conditions caused by the determined current or forecast environmental conditions.

The location of the identified light electric vehicles is determined and provided (540) to a computing device of a requesting individual. In some examples, the location of the identified light electric vehicles may be provided in a user interface such as, for example, user interface 200 shown and described with respect to FIG. 2A-FIG. 2D.

The light electric vehicle management system may then send (550) instructions (e.g., restriction constraint(s) 165) to one or more light electric vehicles that were identified as not having features and/or capabilities that would mitigate the potentially unsafe driving conditions caused by the environmental condition. In this example, the instructions are used to change a mechanical functionality and/or an electrical functionality of the light electric vehicle thereby restricting or prohibiting the light electric vehicle from being used or reserved. As such, an availability state of one or more light electric vehicles may be changed from available to unavailable such as previously described.

Figure 6:
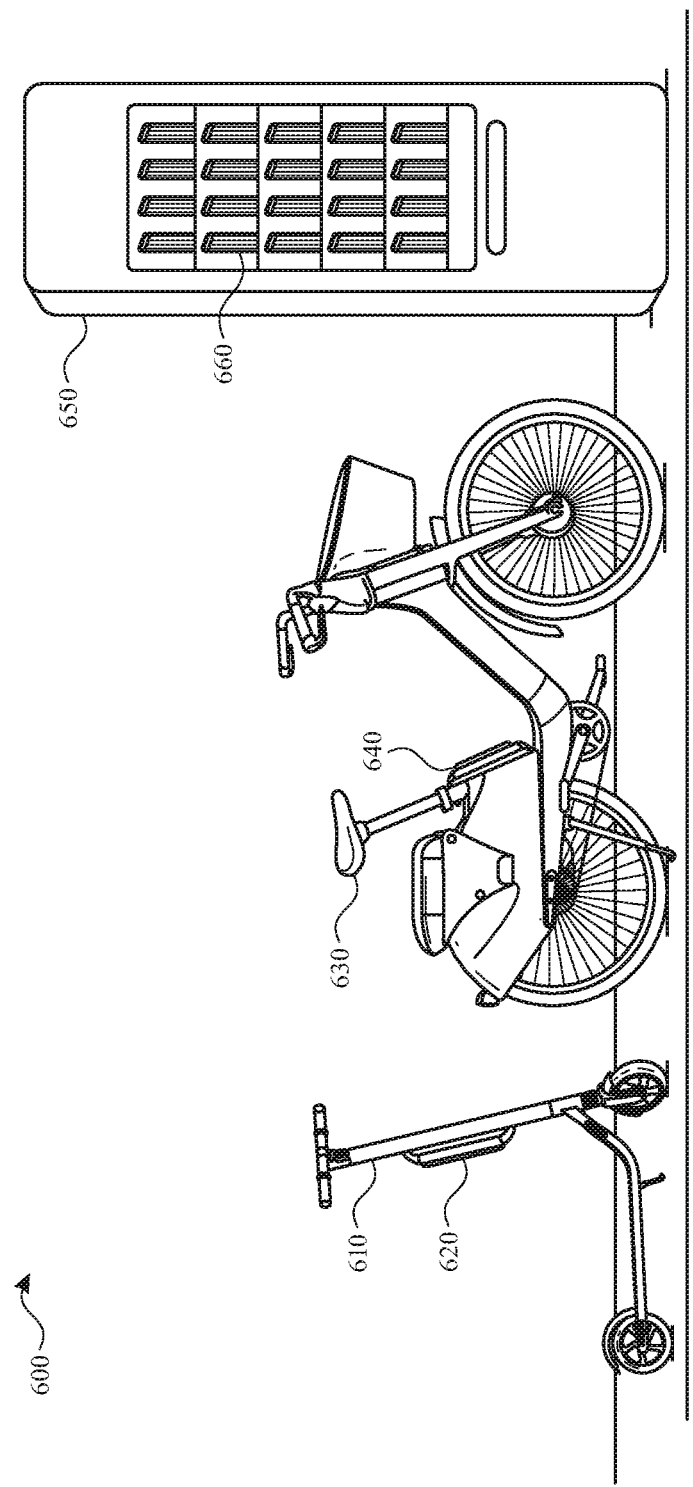
FIG. 6 illustrates an example environment in which aspects of the present disclosure may be practiced.

FIG. 6 illustrates an example environment 600 in which aspects of the present disclosure may be practiced. As illustrated, environment 600 includes an electric scooter(s) 610, an electric bicycle(s) 630, and a rechargeable battery kiosk(s) 650. It will be appreciated that the electric scooter 610 and the electric bicycle 630 are provided as example light electric vehicles and that, in other examples, aspects described herein apply to other types of light electric vehicles.

As described herein, the environment 600 includes a network service that receives information from the electric scooter 610 and/or the electric bicycle 630 (also referred to herein as light electric vehicles) over a network communication channel (e.g., one or more networks, the Internet, etc.). The information enables an individual, using a client application executing on a computing device, to locate, request, and/or reserve (e.g., rent or borrow for a duration of time) one or more light electric vehicles.

In some examples, the network service includes one or more computing systems or servers that are remote from the computing device of the individual and the light electric vehicles. The one or more computing systems includes an application programming interface (API) that enables the one or more computing systems to receive information from, send information to, and otherwise interact with the computing device, the light electric vehicles 610, 630 and/or the rechargeable battery kiosk(s) 650.

For example, the client application executing on the computing device of the individual receives, from the network service over the network communication channel, information about a location of one or more of the light electric vehicles. The location of each of the light electric vehicles can then be provided on a user interface of the client application.

In one example, the user interface of the client application includes a map that displays a determined location of the individual and/or a determined location of the light electric vehicles. In some examples, the determined location of the individual and/or the determined location of the light electric vehicles is based, at least in part, on Global Positioning System (GPS) data (or other location information) received by the network service over the network communication channel.

The user interface of the client application displays the location information of the individual and the light electric vehicles as different icons (or other such visual representations). Once the location information is displayed, the individual may select an icon representing a type of light electric vehicle (e.g., an icon for an electric scooter 610 or an icon for an electric bicycle 630). The user interface of the client application then generates or determines a route (e.g., provides directions) from the individual's current location to the selected light electric vehicle. Selection of one of the icons may also enable the individual to reserve (e.g., place a hold on) the light electric vehicle (to ensure that the light electric vehicle will be at the determined location when the individual arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is reserved, rented or otherwise used by an individual and may track location information at periodic intervals when the light electric vehicle has been reserved or is otherwise not in use.

The one or more computing systems of the network service also include one or more databases that store information about each of the light electric vehicles and/or the rechargeable battery kiosk(s) 650. For example, the one or more databases may store location information for each light electric vehicle and/or the rechargeable battery kiosk(s) 650, rechargeable battery status information for rechargeable batteries used by each light electric vehicle and/or in the rechargeable battery kiosk(s) 650, rechargeable battery kiosk information (e.g., the number of rechargeable batteries housed by the rechargeable battery kiosk 650), and/or light electric vehicle status information (e.g., how many times the light electric vehicle has been reserved, whether the light electric vehicle is damaged, whether the light electric vehicle should be serviced, etc.).

The one or more databases may also securely store information about the individual. This information may include a profile of the individual (e.g., username, contact information, etc.) security credentials of the individual (e.g., a password), historical usage data, payment information and the like. In an example, an individual may opt in to or out of the collection and storage of information. The one or more databases may also store information about the light electric vehicle including one or more results of a brake system inspection process.

The one or more computing systems of the network service may also include a matching system. The matching system receives, manages or otherwise handles various requests from the individual. The requests may include light electric vehicle rental requests and light electric vehicle reservation requests. For example, when a light electric vehicle use request is received from the client application executing on the individual's computing device, the matching system may communicate with the location tracking system and determine which light electric vehicle should be matched with or otherwise assigned to the requesting individual.

The one or more computing systems of the network service may also include a payment system that processes payment information of the individual and/or distributes received incentives to the individual. For example, when an individual rents and uses a light electric vehicle, the individual may be charged for the usage based on a duration of use and/or a travel distance. Once the individual has finished using the light electric vehicle (e.g., by arriving at her intended destination, a check-in point, a battery kiosk 650, etc.), the payment system may automatically process the payment information of the individual. Likewise, if the individual is offered an incentive (e.g., for parking the light electric vehicle in a certain location), the payment system may apply or otherwise provide the incentive to the individual.

As discussed above, the environment 600 includes one or more light electric vehicles including, but not limited to, an electric scooter 610 and an electric bicycle 630. In examples, the electric scooter 610 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 610 by a battery holster 620.

Likewise, and in some examples, the electric bicycle 630 includes vehicle components (e.g., wheels, axles, chains, gear ratios, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 630 by a battery holster 640.

The control system of the electric scooter 610 and/or the electric bicycle 630 may include a controller or control mechanism such as described herein. As such, the control system may manage the power output to the one or motors, provides a visual indication as to a charge level of the rechargeable battery in the battery holster 620, and/or communicates directly (e.g., via Wi-Fi, Bluetooth, etc.) or indirectly (e.g., via one or more remote computing devices, one or more networks, the Internet, etc.) with the computing device of the individual and/or with the network service.

Example communications include, but are not limited to, initiating locking or unlocking of the electric scooter 610 or the electric bicycle 630 (e.g., initiating or ending a travel session), initiating a battery swap to exchange a rechargeable battery in the battery holster 620 or the battery holster 640 with one in a rechargeable battery kiosk 650, determining a location and/or status information of the electric scooter 610 or the electric bicycle 630, and determining a location of a rechargeable battery and/or a rechargeable battery kiosk 650. Lights, speakers, and/or other output devices of the electric scooter 610 or the electric bicycle 630 may be used to provide an indication as to the location of the electric scooter 610 or the electric bicycle 630 or as an anti-theft mechanism, among other examples.

As shown in FIG. 6, each light electric vehicle includes a battery holster. For example, the battery holster 640 is affixed to the seat tube of the electric bicycle 630, while the battery holster 620 is illustrated as being affixed to the handlebar column of the electric scooter 610. It will be appreciated that the locations of the battery holsters 620 and 640 are provided as examples, and that a battery holster may be positioned in a variety of alternate locations in other examples. For example, the battery holster 640 may be affixed to the handlebar column or the cross bar of the electric bicycle 630. As another example, the battery holster 620 may be affixed to the deck or located near the rear of the electric scooter 610.

The battery holsters 620 and 640 are each operable to receive a rechargeable battery. For example, an individual may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the individual. In another example, the rechargeable battery and/or battery holster 620 and 640 may include a visual indicator to display the charge level of the rechargeable battery. In yet another example, a control mechanism coupled to the light electric vehicle may include one or more indicators that reflect the charge level of the rechargeable battery. As an addition or an alternative, the light electrical vehicle, the control mechanism and/or the rechargeable battery itself, may communicate current battery charge information for the rechargeable battery to the network service, which can provide battery information to the computing device of the individual. When this occurs, the individual may be directed to a rechargeable battery kiosk 650. For example, the network service can transmit data, over one or more networks, to the computing device and/or the control mechanism to cause the computing device and/or control mechanism to display information about a particular rechargeable battery kiosk 650 that individual could travel to in order to initiate a rechargeable battery exchange.

When the individual arrives at the rechargeable battery kiosk 650, the individual may exchange the light electric vehicle's current battery with another rechargeable battery housed by the rechargeable battery kiosk 650, thereby enabling the light electric vehicle to continue or resume operation. In some instances, the individual can use the client application executing on the computing device of the individual to locate and/or select a rechargeable battery kiosk 650, receive directions to the rechargeable battery kiosk 650, and initiate a rechargeable battery exchange with the rechargeable battery kiosk 650 when the individual arrives at its location. In another example, a selectable element (e.g., a button) on the control mechanism may enable the individual to initiate a rechargeable battery exchange.

According to examples, when the rechargeable battery exchange is initiated, the control system of the light electric vehicle may enable the rechargeable battery 660 to be removed from a battery holster, such as battery holster 620 or 640. The rechargeable battery 660 may then be exchanged for a different rechargeable battery 660 housed by the rechargeable battery kiosk 650. The rechargeable battery 660 may subsequently be inserted into the battery holster of the light electric vehicle.

The rechargeable battery kiosk 650 stores and charges a set of rechargeable batteries 660. Each rechargeable battery 660 in the set can be used by both the electric scooter 610 and the electric bicycle 630. In some examples, multiple rechargeable battery kiosks 650 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when an individual is traveling through the geographic region on a light electric vehicle and wants or needs to exchange the light electric vehicle's current rechargeable battery for one that has more charge, the individual may be directed (e.g., via the client application executing on the individual's computing device) to the rechargeable battery kiosk 650 associated with the geographic region. When the individual arrives at the rechargeable battery kiosk 650, the individual can exchange their current rechargeable battery for one that is fully charged or substantially fully charged. This enables the individual to travel using a light electric vehicle across distances that may otherwise not be possible using the power provided by one charge of a rechargeable battery.

In some examples, the rechargeable battery kiosk 650 comprises a control system that communicates directly or indirectly with a computing device of the individual and/or the control mechanism of the light electric vehicle when performing the rechargeable battery exchange such as described above. In some examples, the control system communicates with a remote computing device(s), e.g., that implements the network service, using a connection to one or more networks, such as a Wi-Fi network and/or a cellular network. The rechargeable battery kiosk 650 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 7:
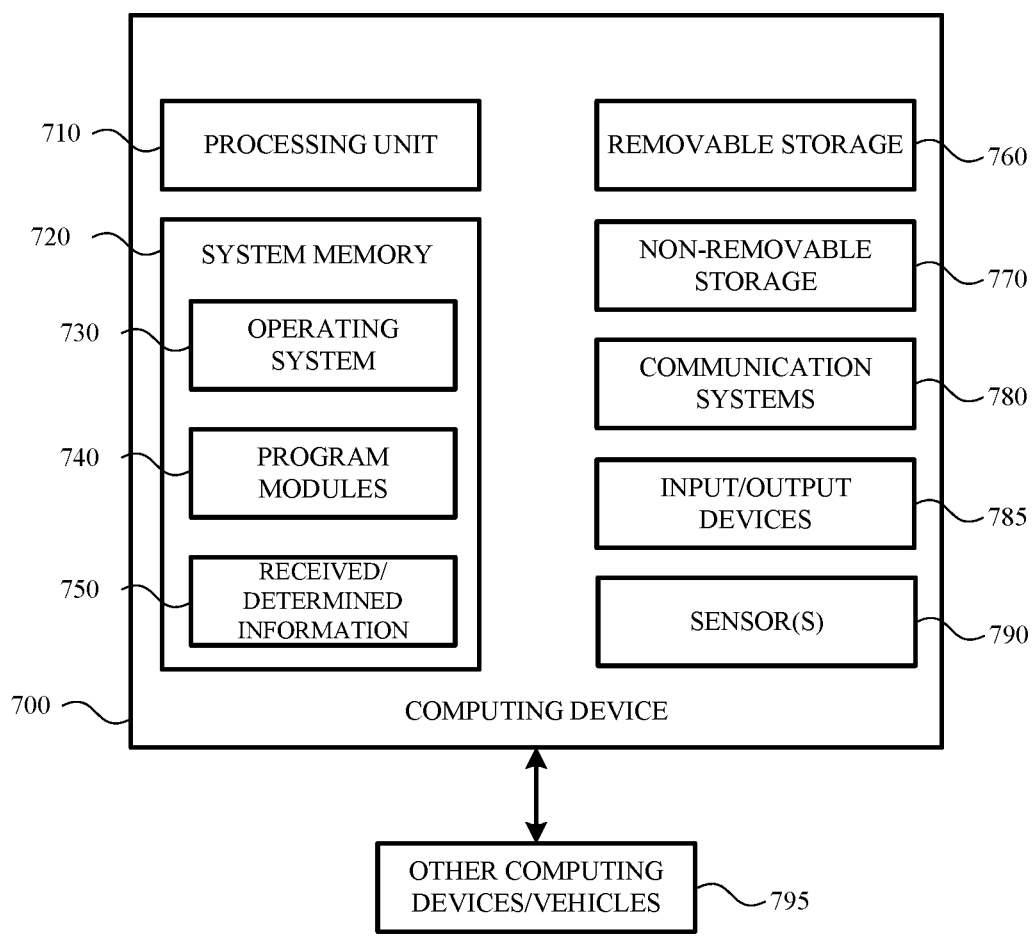
FIG. 7 is a system diagram of various components of a computing device according to an example.

FIG. 7 is a system diagram of a computing device 700 according to an example. The computing device 700 may be integrated with or associated with a light electric vehicle, such as light electric vehicle 150, light electric vehicle 151 and/or light electric vehicle 152 shown and described with respect to FIG. 1A and FIG. 1B. The computing device 700 may also be associated or otherwise integrated with the various systems shown and described with respect to FIG. 1A and FIG. 1B. As shown in FIG. 7, the physical components (e.g., hardware) of the computing are illustrated and these physical components may be used to practice the various aspects of the present disclosure.

The computing device 700 may include at least one processing unit 710 and a system memory 720. The system memory 720 may include, but is not limited to, volatile storage (e.g., random access memory), non-volatile storage (e.g., read-only memory), flash memory, or any combination of such memories. The system memory 720 may also include an operating system 730 that control the operation of the computing device 700 and one or more program modules 740. The program modules 740 may be responsible for gathering environmental condition information, light electric vehicle feature and capability information, rider profile information and so on. The memory may also store this received/determined information 750 or otherwise provide access to this information.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

A number of different program modules and data files may be stored in the system memory 720. While executing on the processing unit 710, the program modules 740 may perform the various processes described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the electric vehicle 700 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 700 may include one or more communication systems 780 that enable the electric vehicle to communicate with rechargeable batteries, other computing devices 795 (e.g., remote computing devices), a network service and the like. Examples of communication systems 780 include, but are not limited to, radio frequency (RF) transmitter, receiver, and/or transceiver circuitry, a Controller Area Network (CAN) bus, a universal serial bus (USB), parallel, and/or serial ports.

The computing device 700 may also have one or more input devices and/or one or more output devices shown as input/output devices 785. These input/output devices 785 may include a keyboard, a sound or voice input device, a touch, force and/or swipe input device, a display, speakers, etc. The aforementioned devices are examples and others may be used.

The computing device 700 may also include one or more sensors 790. The sensors 790 may be used to detect or otherwise determine current environmental condition information in a geographic area in which the computing device 700 is located.

The term computer-readable media as used herein may include computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method, comprising:
receiving environmental condition information for a geographic area, the geographic area having one or more light electric vehicles that are available for reservation by an individual, wherein the one or more light electric vehicles comprise at least one of an electric assisted bicycle or an electric scooter;
identifying, in response to receiving the environmental condition information, the one or more light electric vehicles in the geographic area;
requesting, in response to identifying the one or more light electric vehicles in the geographic area, capability information for the one or more light electric vehicles;
receiving the capability information for the one or more light electric vehicles;
generating one or more restriction constraints for the one or more light electric vehicles based at least in part on the environmental condition information and the capability information; and
transmitting one or more instructions to the one or more light electric vehicles to implement the one or more restriction constraints, wherein the one or more restriction constraints comprise at least one of electronically prohibiting the light electric vehicles from being reserved, electronically prohibiting the light electric vehicles from being used, mechanically prohibiting the light electric vehicle from being reserved, or mechanically prohibiting the light electric vehicle from being used.

2. The method of claim 1, wherein the one or more light electric vehicles comprise a first light electric vehicle and a second light electric vehicle, wherein the first light electric vehicle has a first set of capabilities and the second light electric vehicle has a second set of capabilities that is different than the first set of capabilities.

3. The method of claim 2, wherein the capability information comprises data indicative of the first set of capabilities for the first light electric vehicle and data indicative of the second set of capabilities for the second light electric vehicle, and wherein determining the one or more restriction constraints for the light electric vehicles based at least in part on the environmental condition information and the capability information comprises:
determining that the one or more restriction constraints are to be applied to the first light electric vehicle based at least in part on the first set of capabilities and that the one or more restrictions constraints are not to be applied to the second electric light vehicle based at least in part on the second set of capabilities.

4. The method of claim 3, wherein transmitting the one or more instructions to the one or more light electric vehicles to implement the one or more restriction constraints comprises:
transmitting the one or more instructions to the first light electric vehicle and not to the second light electric vehicle.

5. The method of claim 2, wherein determining the one or more restriction constraints for the light electric vehicles based at least in part on the environmental condition information and the capability information comprises:

determining one or more first restriction constraints for the first light electric vehicle based at least in part on the first set of capabilities and one or more second restriction constraints for the second electric light vehicle based at least in part on the second set of capabilities, wherein the one or more second restriction constraints are different than the one or more first restriction constraints.

6. The method of claim 5, wherein transmitting the one or more instructions to the one or more light electric vehicles to implement the one or more restriction constraints comprises:
transmitting one or more first instructions to the first light electric vehicle to implement the one or more first restriction constraints and one or more second instructions to the second light electric vehicle to implement the one or more second restriction constraints.

7. The method of claim 1, wherein the one or more restrictions constraints indicate a change in an availability state of the one or more light electric vehicles from a first state in which the one or more light electric vehicles are available for reservation to an unavailable state in which the one or more light electric vehicles are unavailable for reservation.

8. The method of claim 1, wherein the one or more restriction constraints are indicative of a top speed limit for the one or more light electric vehicles or a geographic constraint for operating the one or more light electric vehicles.

9. The method of claim 1, wherein the capability information includes battery charge information of a rechargeable battery associated with the one or more light electric vehicles.

10. The method of claim 1, wherein the environmental condition information includes predicted environmental conditions.

11. The method of claim 10, wherein determining the one or more restriction constraints for the one or more light electric vehicles based at least in part on the environmental condition information and the capability information comprises:
determining an ability of the one or more light electric vehicles to operate in the predicted environmental conditions based, at least in part, on the capability information.

12. The method of claim 1, further comprising transmitting a notification to a user interface of a computing device, the notification indicating that access to the one or more light electric vehicles has been restricted due to an environmental condition indicated by the environmental condition information.

13. A system, comprising:
at least one processor; and
a memory coupled to the at least one processor and storing instructions that, when executed by the at least one processor, perform operations, comprising:
determining, based at least in part, on received environmental condition information, an environmental condition associated with a current location;
identifying, in response to determining the environmental condition associated with the current location, a light electric vehicle in a geographic area associated with the current location, wherein the light electric vehicle comprises at least one of an electric assisted bicycle or an electric scooter;

requesting, in response to identifying the light electric vehicle in the geographic are, capability information for the light electric vehicle;

receiving the capability information for the light electric vehicle;

determining, based at least in part, on the capability information of the light electric vehicle and the environmental condition information, to alter at least one capability of the light electric vehicle; and sending one or more instructions to the light electric vehicle that causes the light electric vehicle to alter the at least one capability, wherein the at least one capability that is altered comprises a top speed of the light electric vehicle.

14. The system of claim 13, further comprising instructions for determining whether the environmental condition indicated by the environmental condition information is above a threshold.

15. The system of claim 13, wherein the environmental condition information is current environmental condition information for the current location of the light electric vehicle.

16. The system of claim 13, wherein the environmental condition information is forecast environmental condition information for the current location of the light electric vehicle.

17. The system of claim 13, further comprising transmitting a notification to an electronic device that one or more capabilities of the light electric vehicle has been altered due to the environmental condition information.

18. The system of claim 13, further comprising transmitting a location of another light electric vehicle to a computing device, the another light electric vehicle having one or more features that mitigate the environmental condition indicated by the environmental condition information.

19. A method, comprising:
determining a current location of an individual;
determining, based at least in part, on received environmental condition information, an environmental condition associated with the current location;
identifying, in response to determining the environmental condition associated with the current location, one or more light electric vehicles in a geographic area associated with the current location;
determining, based at least in part, on the current location of the individual, the one or more light electric vehicles available for reservation or use in the current location, wherein the one or more light electric vehicles comprise at least one of an electric assisted bicycle or an electric scooter;
requesting, in response to identifying the one or more light electric vehicles in the geographic area, capability information for the one or more light electric vehicles;
receiving the capability information for the one or more light electric vehicles;
determining, based at least in part, on the received environmental condition information for the current location, to restrict public access to at least one of the one or more light electric vehicles; and
sending an instruction to the at least one of the one or more light electric vehicles that causes the at least one of the one or more light electric vehicles to change one or more availability states, wherein the one or more availability states comprise at least one of the light electric vehicle being available to be reserved or the light electric vehicle being unavailable to be reserved.

20. The method of claim 19, further comprising sending another instruction to the at least one of the one or more light electric vehicles that causes the at least one of the one or more light electric vehicles to change the one or more availability states of the at least one of the one or more light electric vehicles when it is determined that the received environmental condition information indicates that public access to the at least one of the one or more light electric vehicles should not be restricted.

* * * * *